(12) United States Patent
Kinoshita

(10) Patent No.: US 7,019,413 B2
(45) Date of Patent: Mar. 28, 2006

(54) SYSTEM HAVING AN ELECTRIC DEVICE WHICH FUNCTIONS BOTH AS AN ELECTRIC MOTOR FOR DRIVING MACHINES AND AS A GENERATOR TO GENERATE ELECTRICAL POWER, AND HAVING A POWER SOURCE FOR DRIVING THE ELECTRIC DEVICE

(76) Inventor: Yukio Kinoshita, 7-8, Mikanohara-cho 2-chome, Hitachi-shi, Ibaraki, 316-0026 (JP)

(*) Notice: Subject to any disclaimer, the term of this patent is extended or adjusted under 35 U.S.C. 154(b) by 0 days.

(21) Appl. No.: 09/855,563

(22) Filed: May 16, 2001

(65) Prior Publication Data
US 2001/0042983 A1 Nov. 22, 2001

(30) Foreign Application Priority Data
May 19, 2000 (JP) .......................................... 2000-147872
May 19, 2000 (JP) .......................................... 2000-147881

(51) Int. Cl.
*F01C 13/00* (2006.01)
*H02P 9/04* (2006.01)

(52) U.S. Cl. ............................ 290/4 R; 290/4 B; 322/10
(58) Field of Classification Search ............... 290/40 A, 290/40 C, 52, 1 R, 1 A; 322/10, 11, 12
See application file for complete search history.

(56) References Cited

U.S. PATENT DOCUMENTS

| 4,951,769 | A | * | 8/1990 | Kawamura | ................. 180/65.4 |
| 4,959,595 | A | * | 9/1990 | Nishimura | .................. 318/138 |
| 5,771,478 | A | * | 6/1998 | Tsukamoto et al. | ........... 701/68 |
| 6,806,687 | B1 | * | 10/2004 | Kajiura | ......................... 322/16 |

* cited by examiner

*Primary Examiner*—Nicholas Ponomarenko
(74) *Attorney, Agent, or Firm*—Antonelli, Terry, Stout & Kraus, LLP

(57) ABSTRACT

A system which has an electric device that functions in the system both as an electric motor for supplying power to machines and as a generator to generate electrical power. The system includes an outside source of power (an internal combustion engine, wind power, hydraulic power, human power, etc.) which powers the electric device to act as a generator, to generate electricity (electrical power). The electric device includes a stator and rotor, with a laminated iron core.

25 Claims, 30 Drawing Sheets

FIG. 3A1
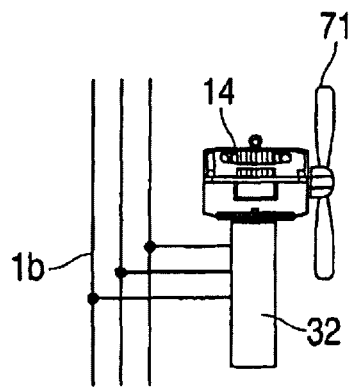
FIG. 3A2
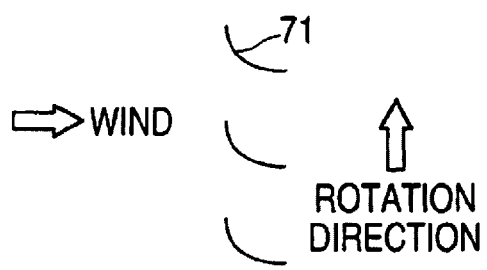
FIG. 3B1
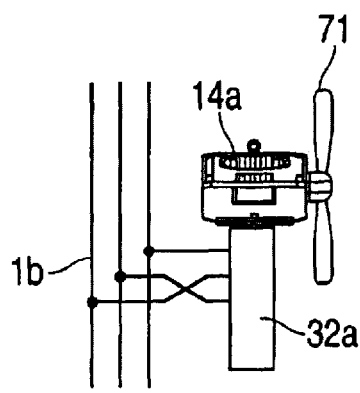
FIG. 3B2
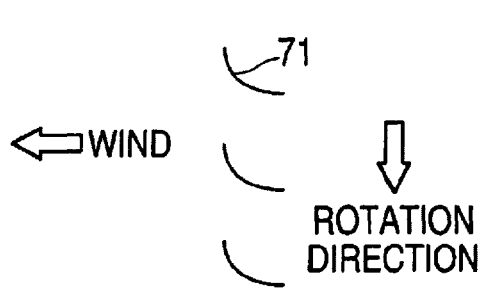
FIG. 3C1
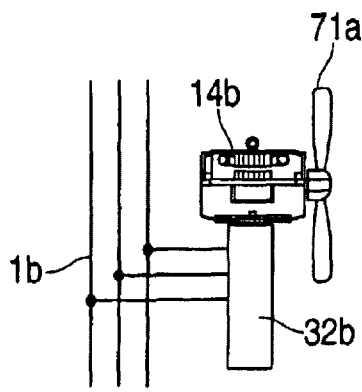
FIG. 3C2
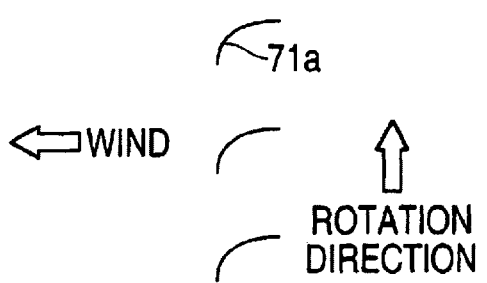

FIG. 9A1
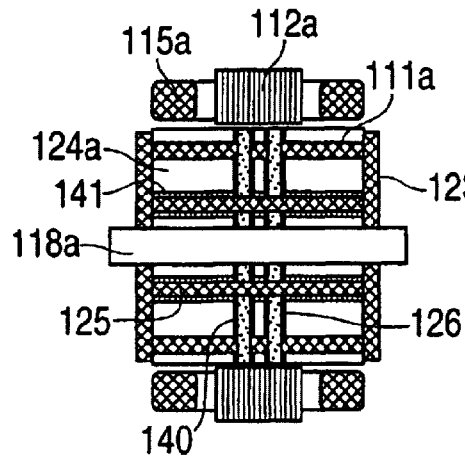
FIG. 9B1
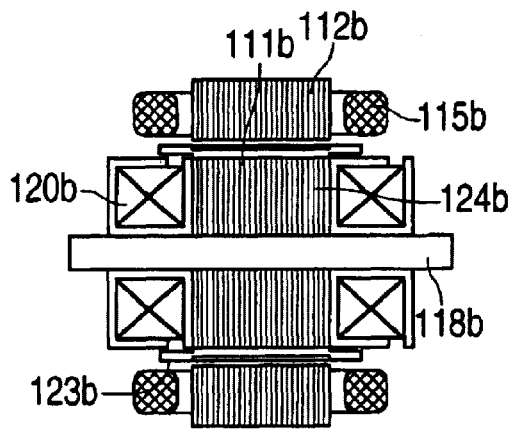
FIG. 9A2
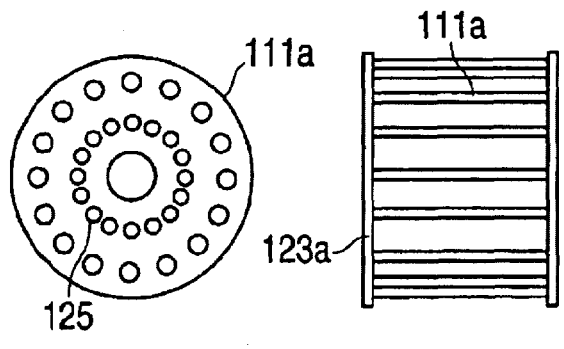
FIG. 9B2
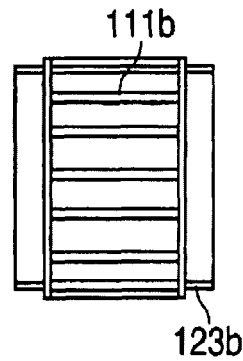
FIG. 9A3
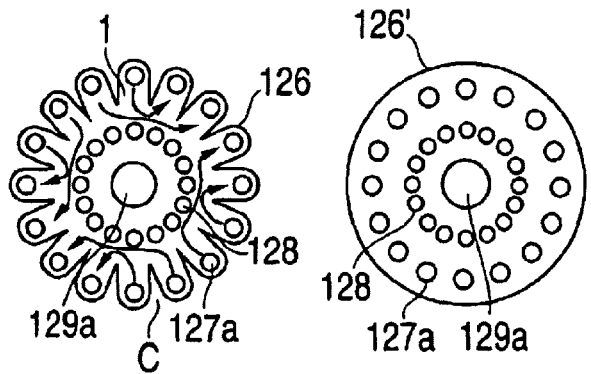
FIG. 9B3
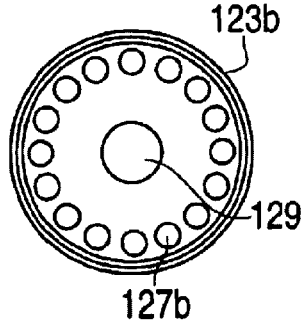

FIG. 10A1
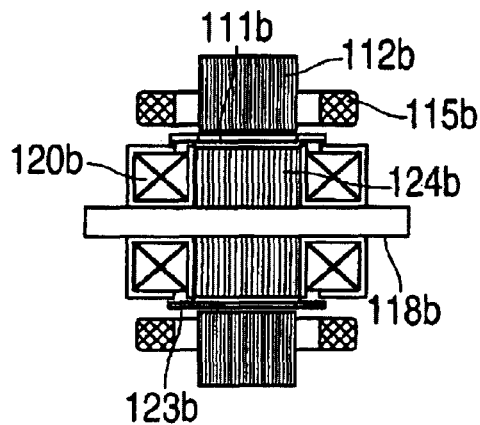
FIG. 10A2
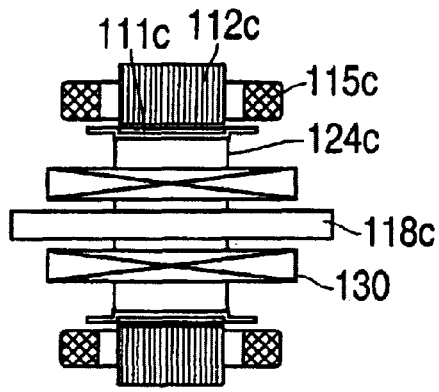
FIG. 10A3
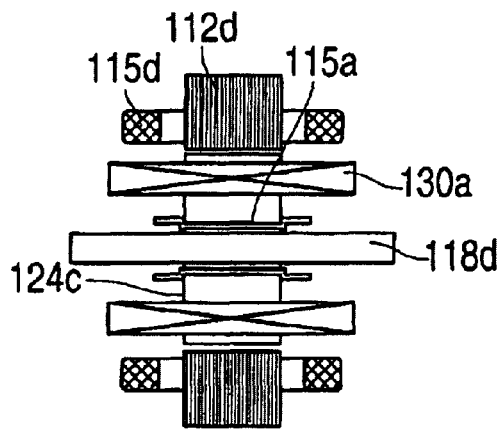
FIG. 10A4
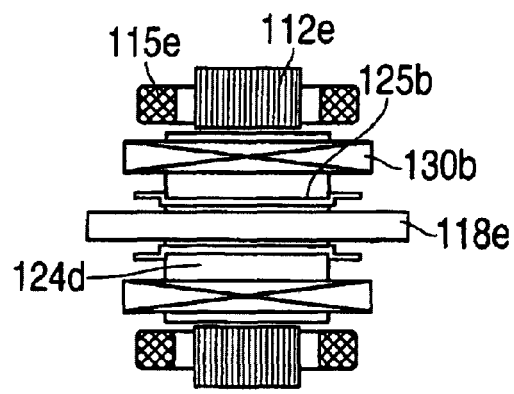
FIG. 10A5
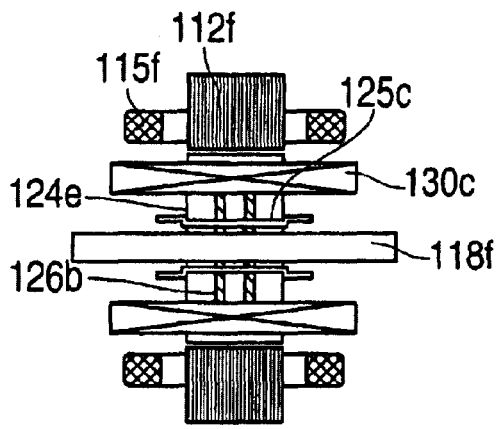
FIG. 10A6
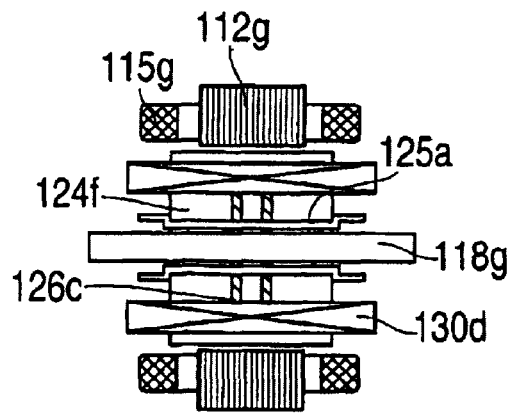

FIG. 13A1
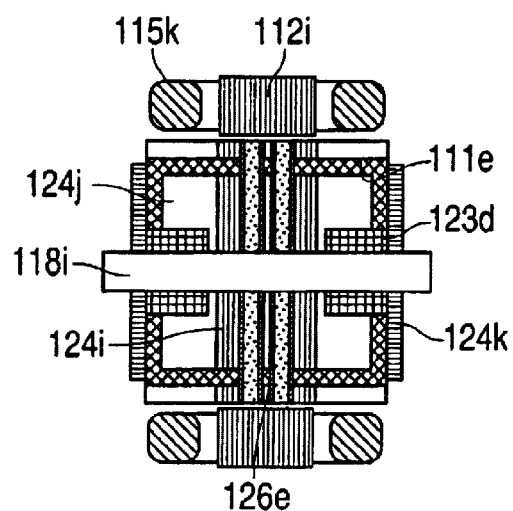
FIG. 13B1
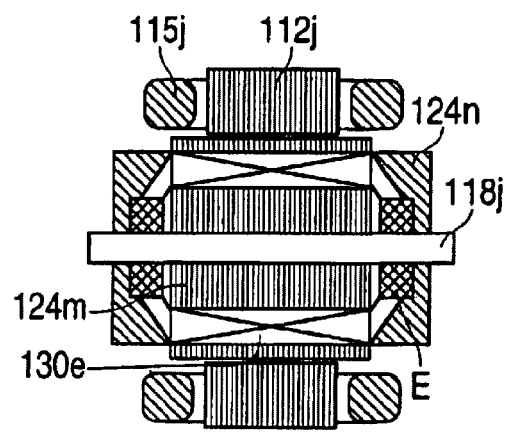
FIG. 13A2
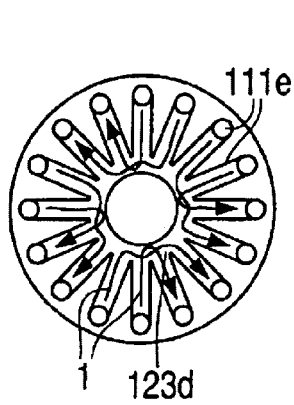
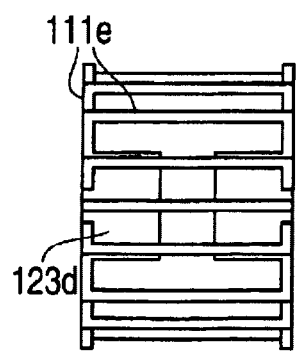
FIG. 13B2
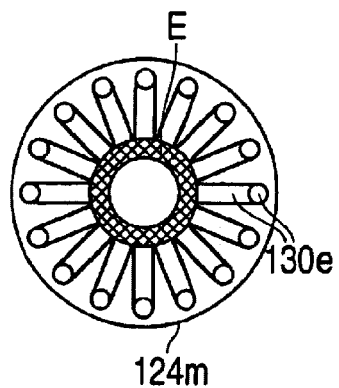

FIG. 14A1
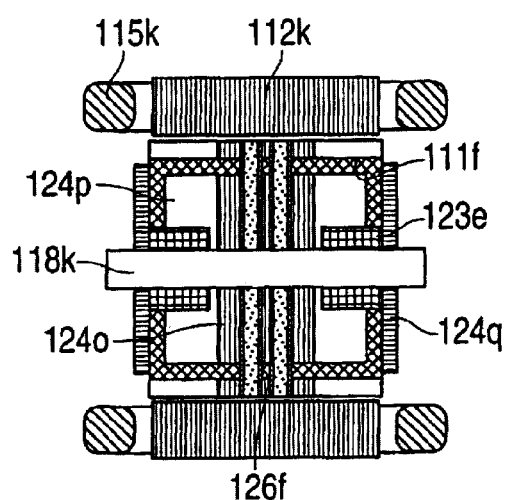
FIG. 14B1
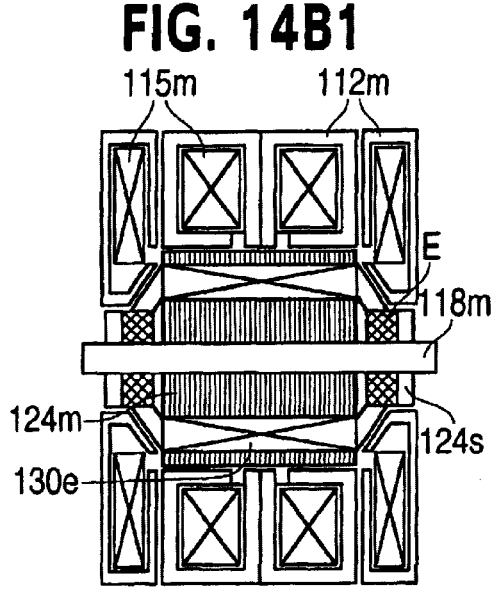
FIG. 14A2
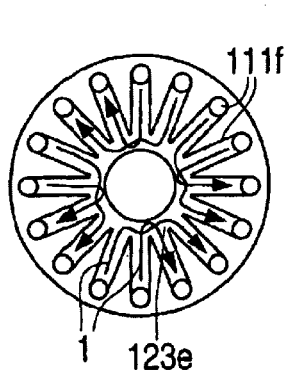
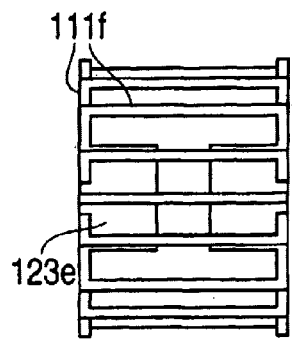
FIG. 14B2
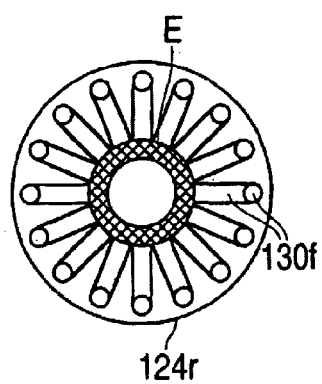

FIG. 15A1
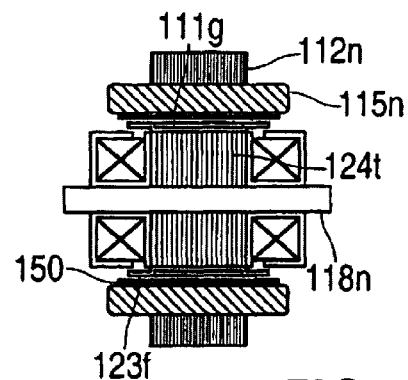
FIG. 15A2
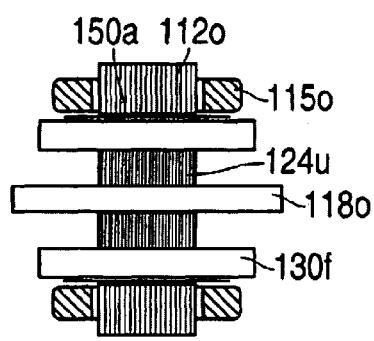
FIG. 15A3
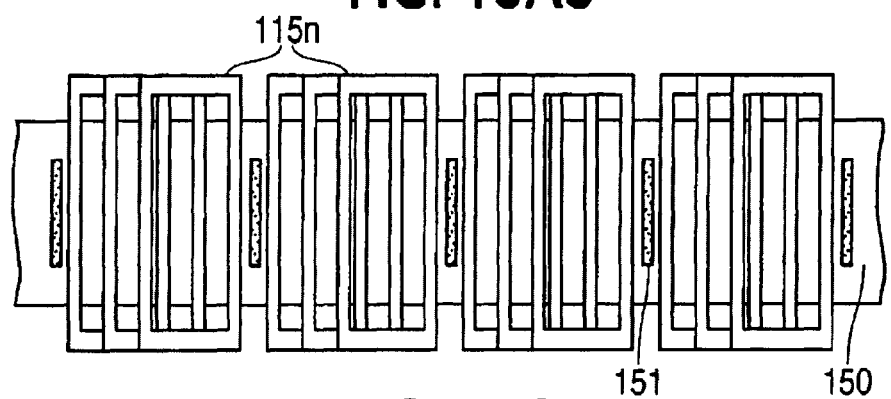
FIG. 15A4
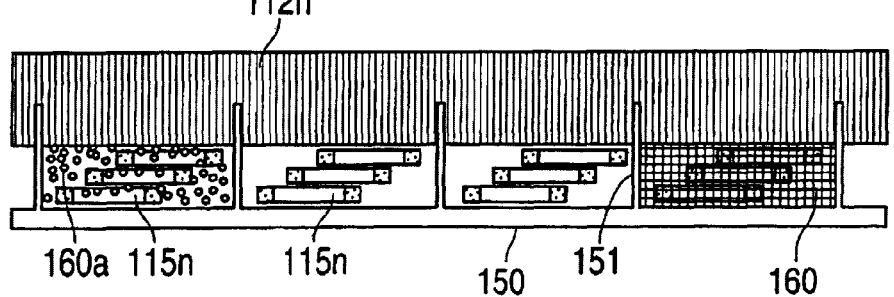

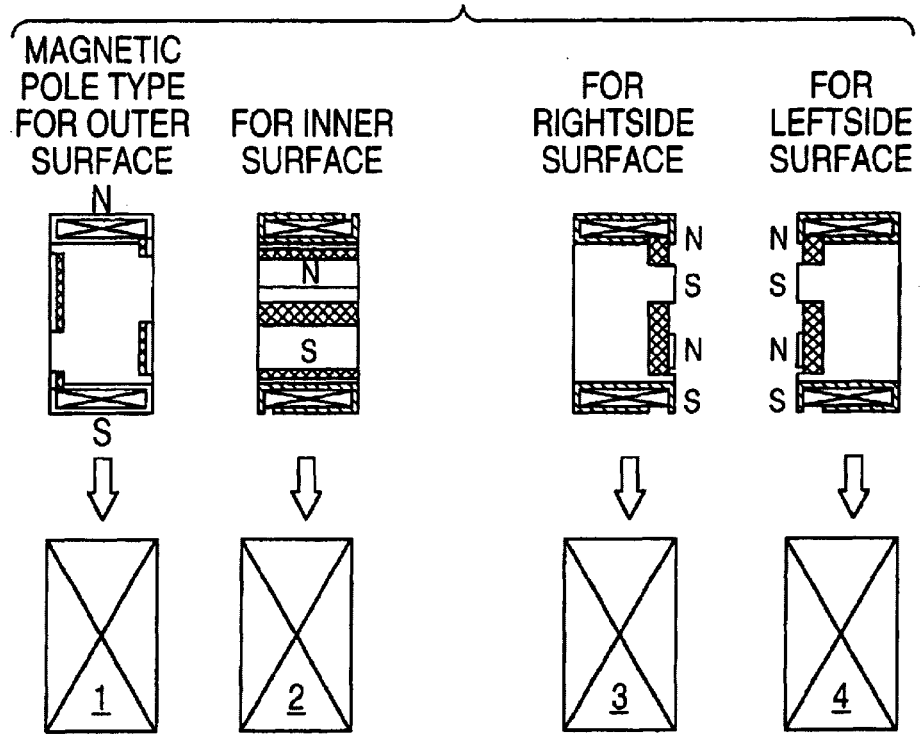
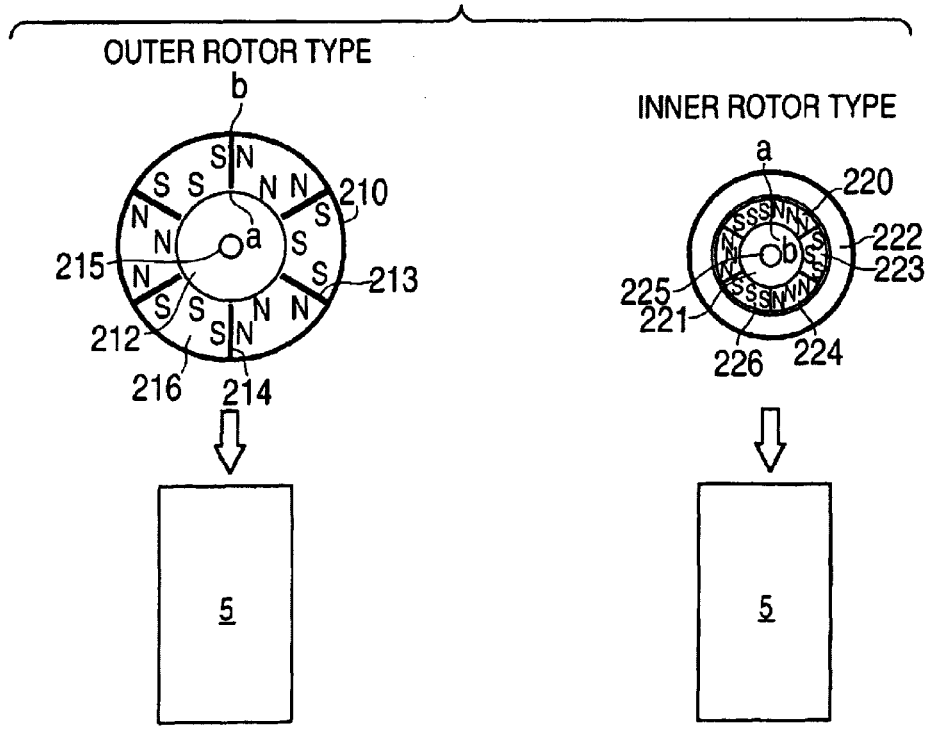

OUTER ROTOR TYPE

INNER ROTOR TYPE

OUTER ROTOR TYPE

INNER ROTOR TYPE

SYSTEM HAVING AN ELECTRIC DEVICE WHICH FUNCTIONS BOTH AS AN ELECTRIC MOTOR FOR DRIVING MACHINES AND AS A GENERATOR TO GENERATE ELECTRICAL POWER, AND HAVING A POWER SOURCE FOR DRIVING THE ELECTRIC DEVICE

BACKGROUND OF THE INVENTION

1. Technical Field

The present invention relates to a system respectively having a function for driving machines and having an electrical power generation function.

2. Prior Art

In general, an electric motor drives machines (apparatus) such as a rotating machine, a pump and a blower etc., and has this single function of driving the machine. For example, the pump is used merely in a transportation of fluid, the blower is used merely to send the air. The electric motor used to drive the pump, blower, etc., is not utilized for power generation.

SUMMARY OF THE INVENTION

An object of the present invention is to provide a system having an electric device functioning respectively both as an electric motor for driving machines and as an electrical generator in an electrical power generation system, wherein another electric motor, an internal combustion engine, or wind power or hydraulic power from outside is utilized to provide power to the device which can both drive a machine and generate electrical power, thereby an electrical power generation function can be obtained.

Another object of the present invention is to provide a system having an electric device functioning respectively both as an electric motor for driving machines and as an electrical generator in an electrical power generation system, wherein in a case in which the device is utilized as a power generation single function, a raise-up to a power generation function can be carried out smoothly; and further, in a case of an electric motor and generator complex, the system functions such as an economical system suited for control of an operation such as a mutual change-over between a single or plural electric motors driving machines and an electrical power generator.

A further object of the present invention is to provide a system having an electric device functioning respectively both as an electric motor for driving machines and as an electrical generator in an electrical power generation system, wherein in a case of a system for driving fluid machinery, a change-over between an electric drive and electrical power generation can be carried out merely altering a mechanical structure such as a blade and a fluid transportation mechanism, without an alteration of an electric control line system.

A further object of the present invention is to provide a system having an electric device functioning respectively both as an electric motor for driving machines and as an electrical generator in an electrical power generation system, wherein in a case of a system for driving fluid machinery, a change-over between an electric drive and electrical power generation can be realized using only electric control, without an alteration of mechanical structure.

According to the present invention, a system has an electric device which functions as an electric motor (that is, the device is an electric motor when electric power is supplied thereto); moreover, the device, when, e.g., mechanical power is applied thereto, functions as an electrical power generator and is used to generate electrical power and is connected in an electric power line.

According to the present invention, in a system having an electric device functioning both as an electric motor and as an electrical power generator, in a case of performing power generation, the generator is activated and has its speed increased near to a synchronous speed and the generator carries out a switch-on operation; in a case of an electric power generation function, the device is instituted in a non-load condition and is activated and has its speed increased near to a synchronous speed from a stop condition and the generator carries out a switch-on operation; and thereby the device performs as an induction motor excited on an electric power system line or an alternating current is constituted.

According to the present invention, in a fluid machinery having a blade or a water turbine and a rotating machine, in a case of a propelling machine, a twist angle is reversed, and in a case of a centrifugal machine, an intake port of the fluid is changed over from a fluid intake side to a fluid exhaust side; thereby without an alteration of a control circuit, a fluid transportation function is changed over to an electrical power generation system.

According to the present invention, in a system having an electric device functioning respectively both as an electric motor and an electrical power generator, when using the device as an electric motor which is a power source to drive machines and which is connected to an electric power line, in every case of a power generation function and a complex function of the device as an electric motor, as a power source for driving machines, and the generator, when a stopped motor or a driving function is changed over to electrical power generation, data necessary to control a load condition, an outside portion power condition, a power condition of an outside generator etc. are detected by a sensor; and in accordance with the detected data the stopped motor or the driving function is changed over to the power generation system, thereby a whole system is operation-controlled.

According to the present invention, in a wind power generation system having the electric device functioning as an electric motor and as a generator, and having blade structure to contact blowing air, carrying out a wind power generation by taking air from all directions, a wind direction guide is installed; and the device, when functioning as an electric motor, is an induction motor.

According to the present invention, in a wind power generation system having the electric device functioning as an electric motor and a generator, and having blade structure to contact blowing air, carrying out a wind power generation, an inclined magnetic field is formed in a flow passage using one selected from a single permanent magnet, a single electromagnet, plural permanent magnets and plural electromagnets; and air is moved always according to oxygen in the air and the inclined magnetic field.

According to the present invention, in a fluid power generation system having a fluid machine constituted by a blade, a water turbine and a rotating machine, and having the electric device functioning respectively both as an electric motor and a generator, in a case of a single power generation function the system is activated as the generator and the generator has its speed increased near to a synchronous speed; and in a case of a complex function of the electric motor and the electrical power generator, a rotation magnetic field is varied electrically, and the system has the device activated and the device has its speed increased near to a synchronous speed.

According to the present invention, in a rotating machine having a stator and a rotor, a single conductive member or plural conductive members are provided with a sandwich shape in a laminated iron core; and on an outer peripheral portion of the conductive member, a groove is provided to block flow of current directly between rotor bars.

According to the present invention, in a rotating machine having a stator and a rotor, a single disc member or plural disc members are provided in a laminated iron core of the rotor; and the laminated iron core of the rotor is projected from an axial direction length of an iron core of the stator.

According to the present invention, in a rotating machine, an extension portion of a rotor bar is formed on an outer peripheral portion of an end ring; thereby a magnetic field of an overhang portion of the laminated iron core of the rotor is formed validly.

BRIEF DESCRIPTION OF DRAWING

FIGS. 3A1, 3B1 and 3C1 are explanatory views showing an application example to a generator of a fluid machinery represented by a blower or a pump, with FIGS. 3A2, 3B2 and 3C2 illustrating rotation directions thereof, respectively;

FIGS. 9A1–9A3 and 9B1–9B3 are explanatory views showing an inner conductive member and an outer conductive member of a rotor structure of a rotating machine according to the present invention;

FIGS. 10A1–10A6 are explanatory views showing a combination of a winding type conductive member and a cage type conductive member according to the present invention;

FIGS. 13A1, 13A2, 13B1 and 13B2 are explanatory views showing an effect in a case where a rotor iron core is projected or over-hung from a stator iron core according to the present invention;

FIGS. 14A1, 14A2, 14B1 and 14B2 are explanatory views showing an effect in a case where a stator iron core is projected or over-hung from a rotor iron core according to the present invention;

FIGS. 15A1–15A4 are explanatory views showing an improvement example of a rotating machine having a slot-less iron core according to the present invention;

FIGS. 24A and 24B are explanatory views showing a combination example of four kinds of electromagnets and two kinds of magnets of a rotor of a six-pole rotating machine to understand the combination example of the magnet and the electromagnet according to the present invention;

DESCRIPTION OF THE INVENTION

Figure 1A:
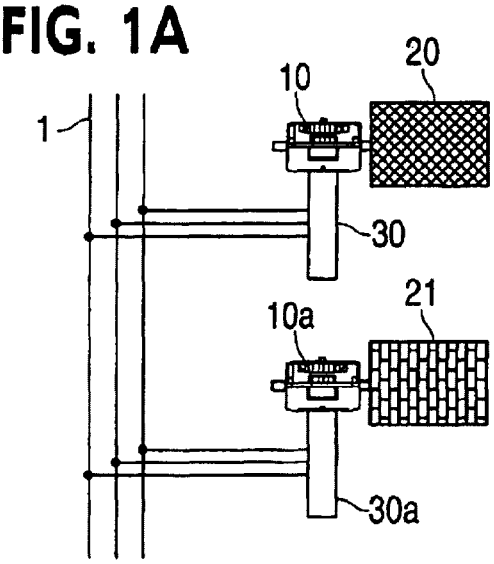
FIGS. 1A and 1B are explanatory views respectively showing an embodiment of (a) a system having an electric device functioning respectively as an electric motor and an electrical generator, together with a power source supplying power to the electric device when the device acts as an electrical generator, according to the present invention (FIG. 1B) and (b) an electric drive system having an electric motor providing electric power to drive machines according to the prior art (FIG. 1A)
Figure 1B:
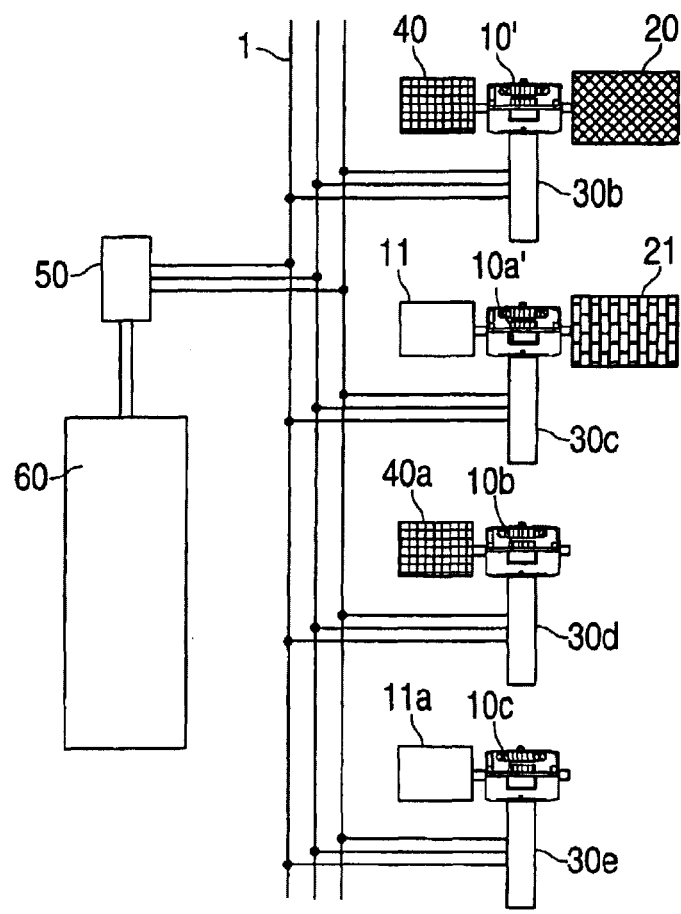

Hereinafter, one embodiment of an electric drive and electrical power generation system (that is, a system having an electric device that can supply power (mechanical power) to drive machines such as compressors, machine tools, i.e., an electric motor, and that can generate electrical power when connected to a, e.g., mechanical power source) according to the present invention will be explained referring to the drawings. FIGS. 1A and 1B are comparison explanatory views respectively (a) of a system including an electric motor for driving (supplying mechanical power to) machines, according to the prior art, and (b) of a system with an electrical device which functions respectively both to drive (supply mechanical power to) machines and to generate electrical power, according to the present invention. FIG. 1A is an explanatory view showing the system according to the prior art, and electric motors 10 and 10a are connected to an electric power line 1 and the system is used to supply power for a machine tool 20 and a compressor 21. As stated above, in the job sites such as works and a consumer, the electric motor is used generally as a mere power supplier. The electric motors 10 and 10a, the machine tool 20 and the compressor 21 are controlled by control board 30 and 30a.

On the other hand, with the electric drive and electrical power generation system according to the present invention, as shown in FIG. 1B, an electric motor being utilized merely to supply power in the prior art is utilized as a generator in the present invention, by adding a prime mover, external to the generator, or by using an integral electric drive generator, and according to the present invention an electric drive and power generation system can be obtained. In a case where the electricity generated by the power generation system of the electric motor is insufficient, a new generator monopoly use internal combustion engine 40a, generators 10b, 10c connected to an electric motor 11a can be added.

To an outside portion of the electric motors 10 and 10a connected to the electric power line 1 the internal combustion engine 40 as the prime mover and the electric motor 11 are added, and the electric motors 10 and 10b having been used as the electric motor in the prior system are used as the electrical power generators 10' and 10a'. These apparatuses are controlled by control board 30b and 30c. The newly added generators 10b and 10c are controlled by control boards 30d and 30e. A condenser 60 is provided to accumulate surplus electric power to perform the electric power supplement and the take-in and the take-out of the electric power can be carried out between this condenser 60 and the electric power line 1 through an inverter 50.

Figure 2A:
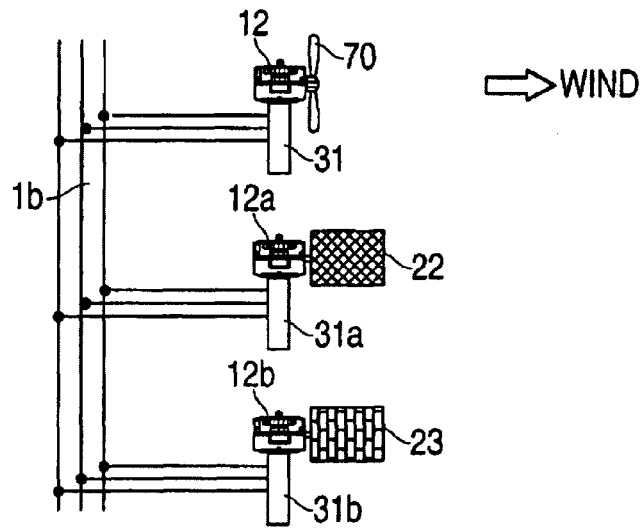
FIGS. 2A and 2B are explanatory views respectively showing an embodiment of (a) a system having a device, which when functioning as an electric motor in the present invention, is an induction motor, for simplifying the electric drive and electrical power generation system according to the present invention (FIG. 2B) and (b) the electric drive system having an induction motor providing power to drive machines according to the prior art (FIG. 2A)
Figure 2B:
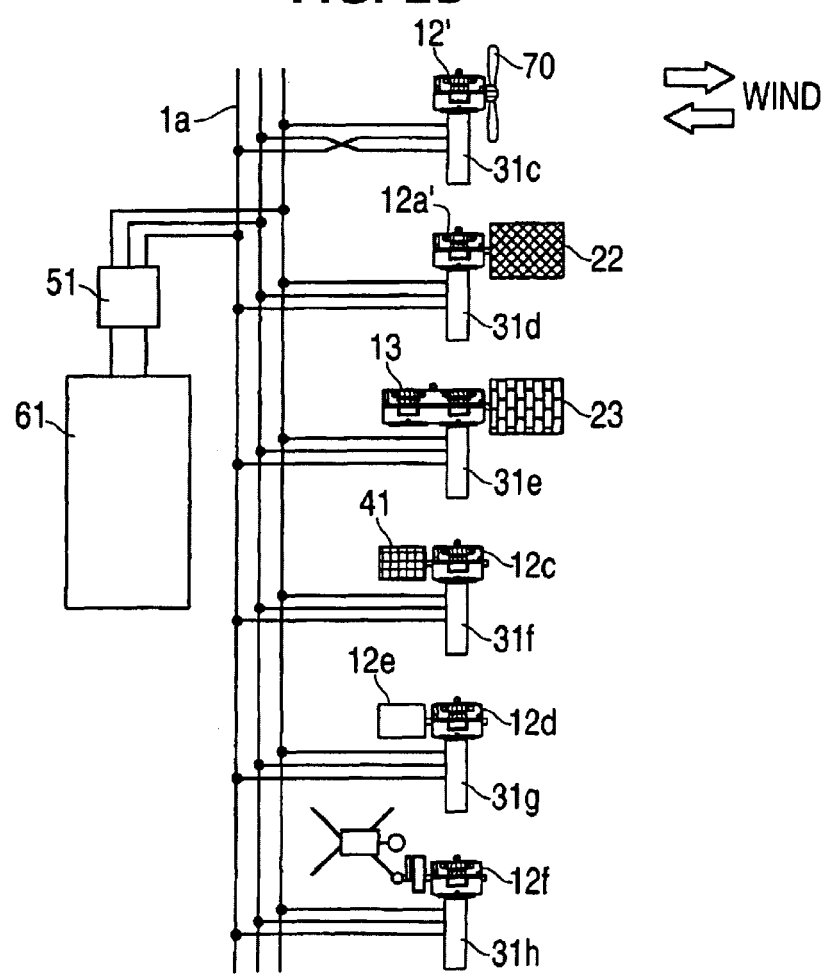

FIGS. 2A and 2B are explanatory views showing an example of the system of the electric motor which is constituted with an induction motor to constitute simply the system explained with FIGS. 1A and 1B. FIG. 2A is an explanatory view of a system according to the prior art and induction motors 12, 12a and 12b connected to an electric power line 1a have power applied to. Represented as a fluid machinery driven by the induction motor 12 is a blower having blades 70 installed and operated as the blower, and the induction motors 12a and 12b are used as a power for a pump hydraulic turbine 22 and a compressor 23. As stated above, in the job sites such as works and a consumer, the electric motor is used generally merely to supply power. The induction motors 12, 12a and 12b, the pump hydraulic turbine 22 and the compressor 23 are controlled by control boards 31, 31a and 31b.

On the other hand, in the electric drive and electrical power generation system according to the present invention shown in FIG. 2B, in the prior art the system is operated as the blower in which the blades 70 are installed to the induction motor 12. However, according to the present invention, by altering electric circuits, the system can be utilized as a generator 12' or to the generator 12' is formed as a power using water etc. from an outside portion, or by replacing it with an integral type electric and power generator 13, accordingly the system is utilized as the generator. According to the present invention an electric drive and power generation system can be obtained.

In a case where the electricity generated by the electric motors 12', 12a' and 13 according to the prior art is insufficient, a new generator monopoly internal combustion engine 41, generators 12c, 12d and 12f driven by an electric motor 12e and human power 28 can be added. The generators 12', 12a' and 13 are controlled by control boards 31c, 31d and 31e. The newly added generators 12c, 12d and 12f are controlled by control board 31f, 31g and 31h. An energy accumulation unit 61 such as a condenser 61 is provided to accumulate surplus electric power to perform the electric power supplement and the take-in and the take-out of the electric power can be carried out between this condenser 61 and the electric power line 1a through an inverter 51.

In a case where the induction motor is utilized as the generator, in the induction motor and an asynchronous generator a rotor suited to the control can be formed with a winding type rotor and a deep groove type rotor.

FIGS. 3A1 and 3A2, 3B1 and 3B2, and 3C1 and 3C2 are explanatory views of an example of a generator applied to a fluid machinery which is represented by a blower and a pump etc. FIG. 3A1 and FIG. 3A2 show cases in which the system is operated as the blower. The blower is connected to an electric power line 1b and is constituted by blades 71 and an electric motor 14. The electric motor 14 is made to rotate the blades 71 by a control board 32 and the wind is flown out in an arrow direction shown in the figures. FIG. 3A2 is a cross-sectional view which is developed by cross-sectioning a circular periphery in some radial portion from a rotation center of the blade 71. Since the blade is rotated in a black arrow mark rotation direction, the wind is sent out in the arrow direction.

In FIG. 3B1 and FIG. 3B2, a mechanical alteration of the blade 71 etc. of the blower shown in FIG. 3A1 and FIG. 3A2 is not carried out wholly but an electric alteration is carried out. From the electric viewpoint, in a case of a multi-phase rotating machine a phase order is altered and a case of a single-phase rotating machine a polarity characteristic of a main winding is altered and the rotation direction of the blower is changed and then an external wind reversed in direction to that in FIGS. 3A1 and 3A2, is received and the electrical power generation is carried out.

In this case, even with small outside wind to carry out the electrical power generation, the rotation number of the electric motor 14a increases near to a synchronous speed, and power generation is carried out with the large rotation number suited to a wind power larger than the synchronous speed. The voltage is that of the electric power line 1b, and the current suited to the electricity generated is supplied to the electric power line 1b. A control of this blower is carried out using a control board 32a. FIG. 3B2 shows a cross-section of the blade 71 which is the entire same one shown in FIG. 3A2.

In FIG. 3C1 and FIG. 3C2, an electrical circuit alteration of the blade 71 etc. of the blower shown in FIG. 3A1 and FIG. 3A2 is not carried out wholly but a mechanical alteration is carried out. From the mechanical viewpoint, a blade 71a which has a reversal twist angle of the blade 71 etc. and in a case of a centrifugal blade only a mechanical alteration such as a flow passage is carried out, and then wind reversed to the wind sending direction for the power generation is carried out.

In this case, even with small outside wind to carry out the power generation, the rotation number of the electric motor 14b increases near to a synchronous speed, and the power generation is carried out with the large rotation number being suited to the wind power larger than the synchronous speed. The voltage is that of the electric power line 1b, and the current being suited to the electricity generated is supplied to the electric power line 1b. A control of this blower is carried out using the control board 32b. FIG. 3C2 shows a cross-section of the blade 71a which has the entire reversal twist angle shown in FIG. 3A2.

Figure 4A:
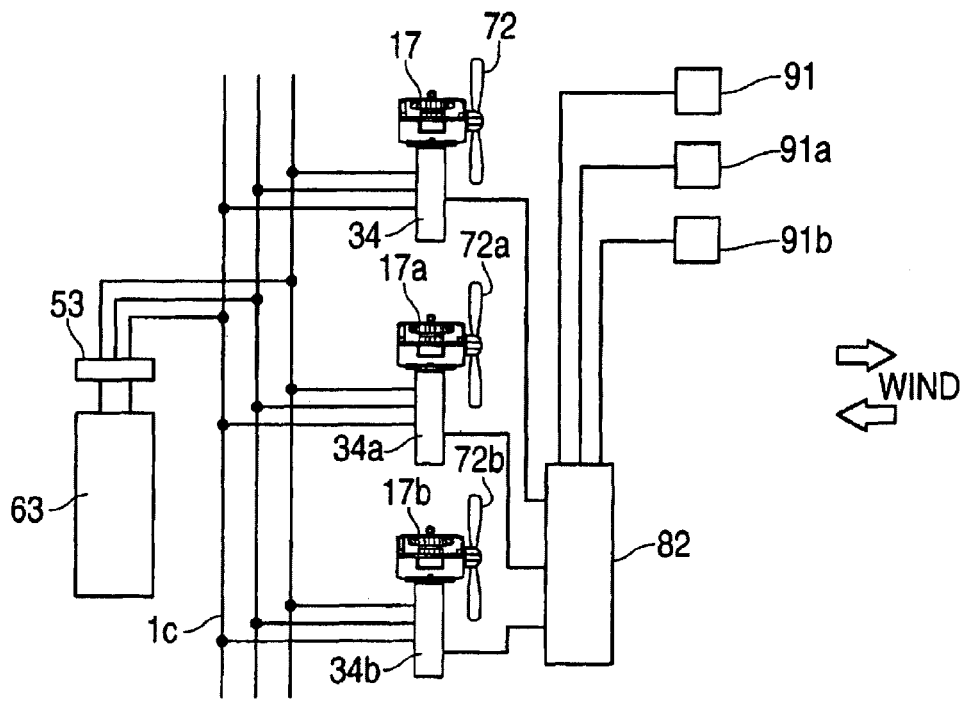
FIGS. 4A and 4B are explanatory views showing an electric motor and a generator using plural fluid machinery according to the present invention and using sensor groups for detecting such parameters as a flow velocity and temperature by which a respective operation condition is grasped and controlled.
Figure 4B:
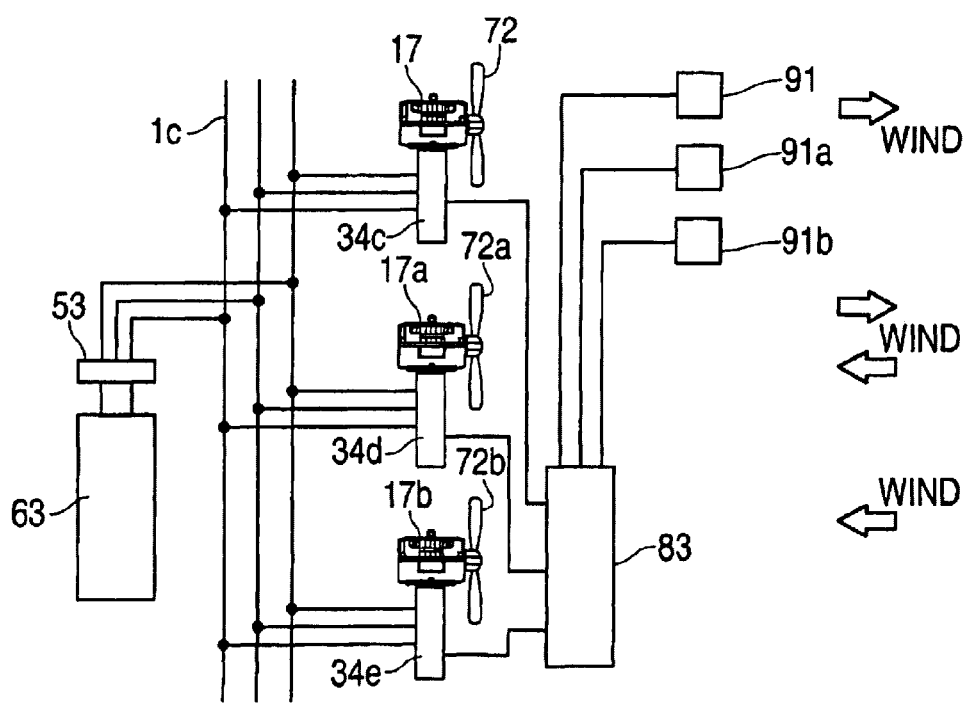

FIG. 4A and FIG. 4B show the systems among the electric drive and power generation systems using the plural fluid machinery according to the present invention. The electric drive condition, the power generation condition, the load condition and the environment condition are picked up or grasped according to the various kinds of sensors 91, 91a and 91b, then the operation condition is grasped, and further using central controllers 82 and 83 a whole system control is carried out, as a result an effective operation can be carried out.

FIG. 4A shows an example of the system in which the electric drive is changed over at the same time in the whole system, and FIG. 4B shows an example of the system wherein of the total number of the blowers in the electric drive and power generation system the respective operation number of the power generation or the electric drive is determined, and at the same time the complex operation of the power generation and the electric drive is carried out.

In FIG. 4A and FIG. 4B, reference numerals 17, 17a and 17b indicate electric drive generators, reference numerals 72, 72a and 72b indicate blades, and reference numerals 34, 34a, 34b, 34c, 34d, and 34e indicate control boards for controlling the respective blowers. A reference numeral 63 indicates an energy accumulation unit such a condenser and a reference numeral 53 indicates an energy conversion unit such as an inverter.

Figure 5:
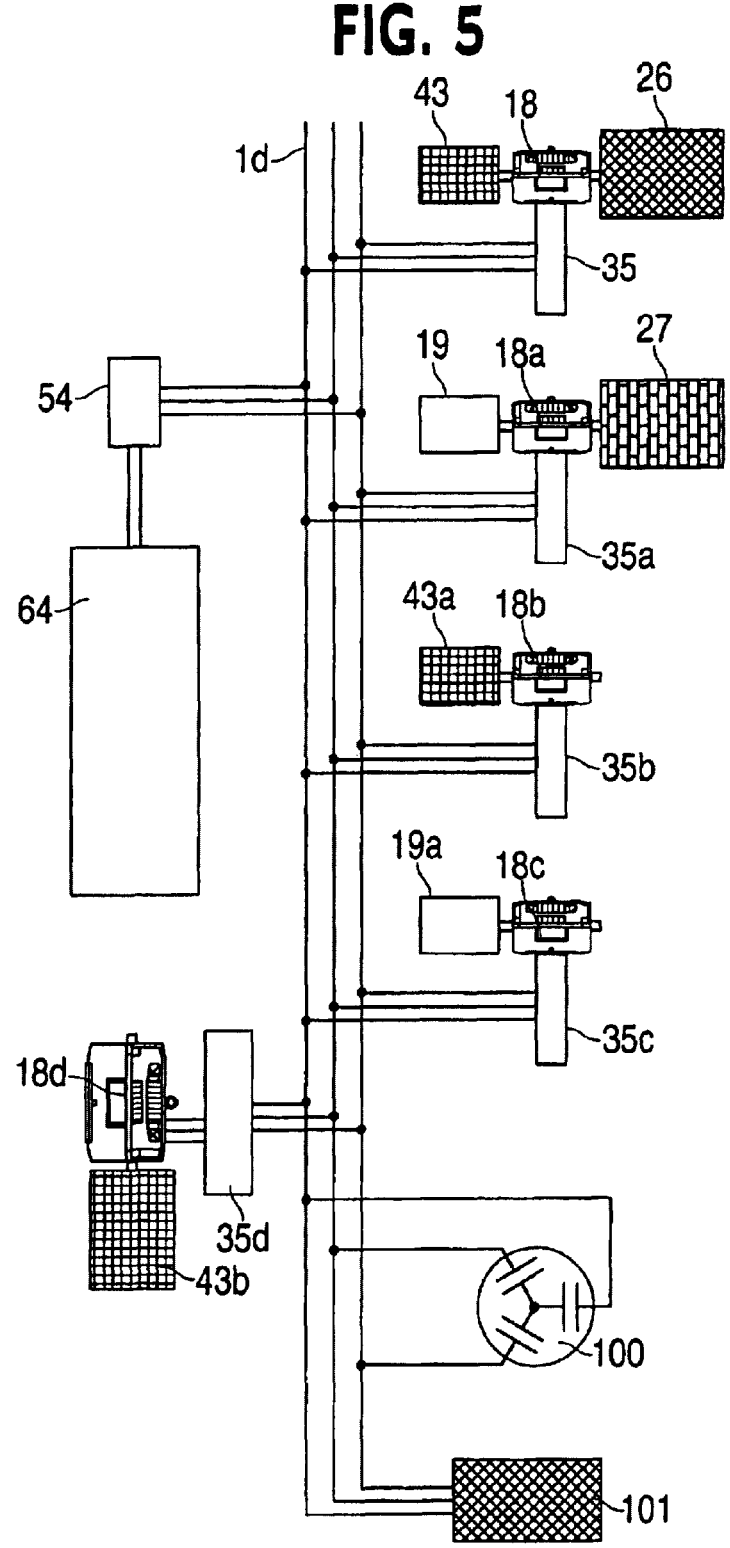
FIG. 5 is an explanatory view showing an electric motor and a generator according to the present invention in which the electric motor and the generator are installed at a place where an electric power line is not provided.

FIG. 5 is an explanatory view showing an example of a case where the electric drive and power generation system according to the present invention is constituted in a place having no electric power line and a transportation facility such an automobile and the voltage and the frequency of the electric power line 1d can be selected as a most suited one for the system. As the power supply for supplying the electric power to the electric power line 1d there are the energy accumulation unit 64 and the inverter 54, and the alternating synchronous generator 18d is driven by a prime mover 43b such as an internal combustion engine and the power generation is carried out. The electric drive power generation unit connected to the electric power line 1d has the above stated contents and the detailed explanation thereof will be omitted. Reference numerals 18, 18a indicate electric drive generators, reference numerals 18b, 18c and 18d indicate generators, and a reference numeral 19a indicates a drive use electric motor of the generator 18c. A reference numeral 26 indicates a pump hydraulic turbine, and reference numerals 43a and 43b indicate prime movers such as the drive use internal combustion engine. A reference numeral 100 indicates a condenser used for a power factor improvement of the system load and a power generation wave form adjustment, and a reference numeral 101 indicates a general load means for supplying the electric power using the electric power line 1d.

Figure 6A:
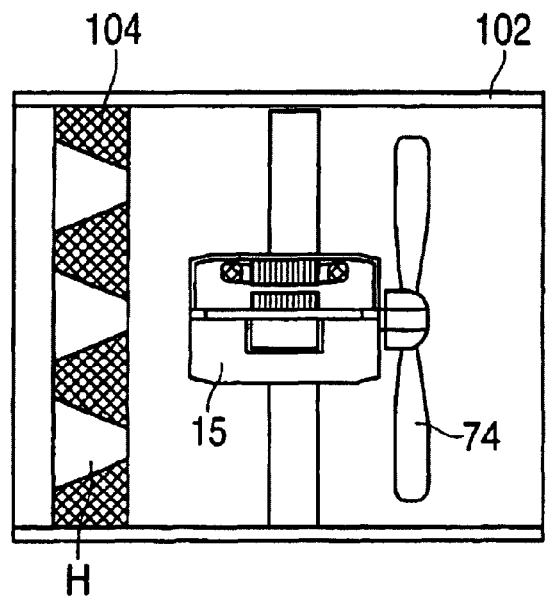
FIGS. 6A and 6B are explanatory views showing an air acceleration element of a magnet according to the present invention.
Figure 6B:
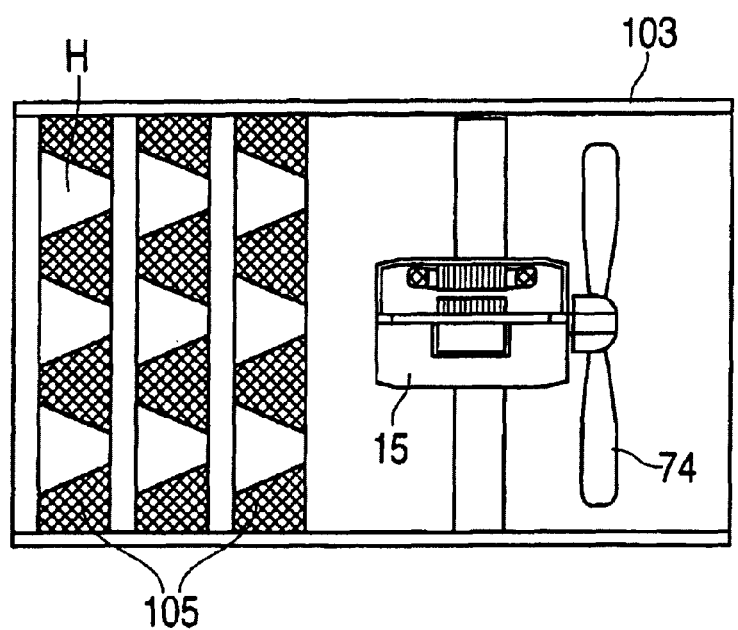

FIGS. 6A and 6B are explanatory views showing an example of a case where to the blower, an element for moving the air using a magnet 104 is mounted; and in FIG. 6A one element is mounted and in FIG. 6B plural elements are mounted. A reference numeral H indicates an inclined hole in which the magnetic field is strengthened in a wind flow direction, and since the oxygen in the air is a paramagnetic substance the air is moved without the energy and the performance of the blower can be increased. For example, under the magnetic field of 1 Stera, the wind velocity of 0.6 m/s can be obtained. FIG. 6B is an example in which in a magnet 105 of plural elements is provided and blowing of the air can be further increased without the energy. A reference numeral 15 indicates an electric motor, a reference numeral 74 indicates a blade and reference numerals 102 and 103 indicate frames. In a case in which the magnet is replaced with an electromagnet, the similar effects can be obtained.

Figure 7A:
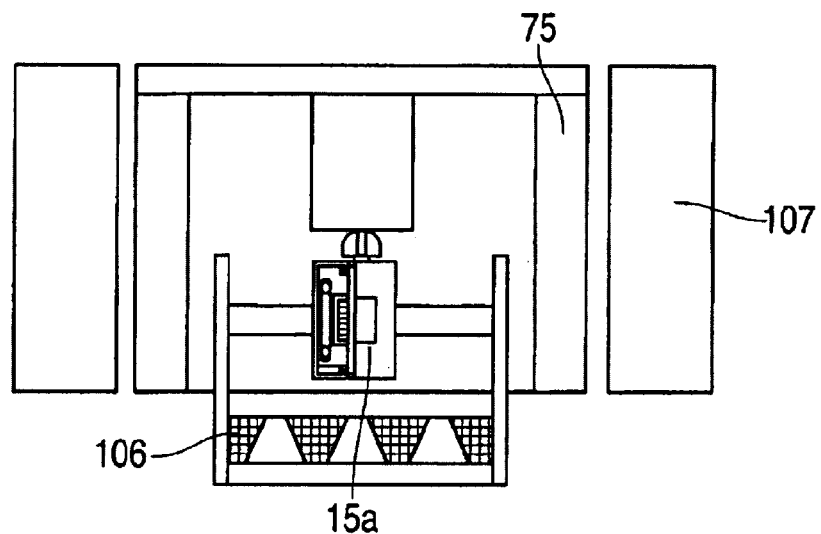
FIGS. 7A and 7B are explanatory views showing a wind power generator for taking air from a whole periphery and for carrying out electrical power generation according to the present invention.
Figure 7B:
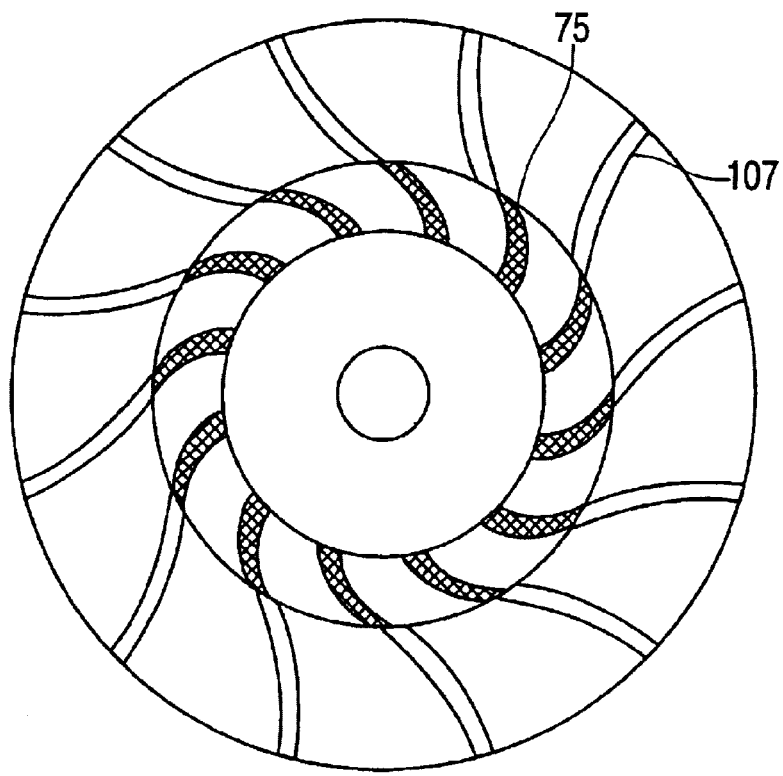

FIGS. 7A and 7B show a wind power generator which carries out the power generation by receiving the wind from a whole periphery and in this generator a wind direction guide 107 is arranged in a surrounding portion of a centrifugal blade 75 and in any wind direction the wind can work validly to the blade. FIG. 7A shows a whole cross-sectional view and FIG. 7B is a cross-sectional view showing a relationship between a blade 75 and a wind direction guide 107. A reference numeral 15a indicates a generator.

Figure 8A:
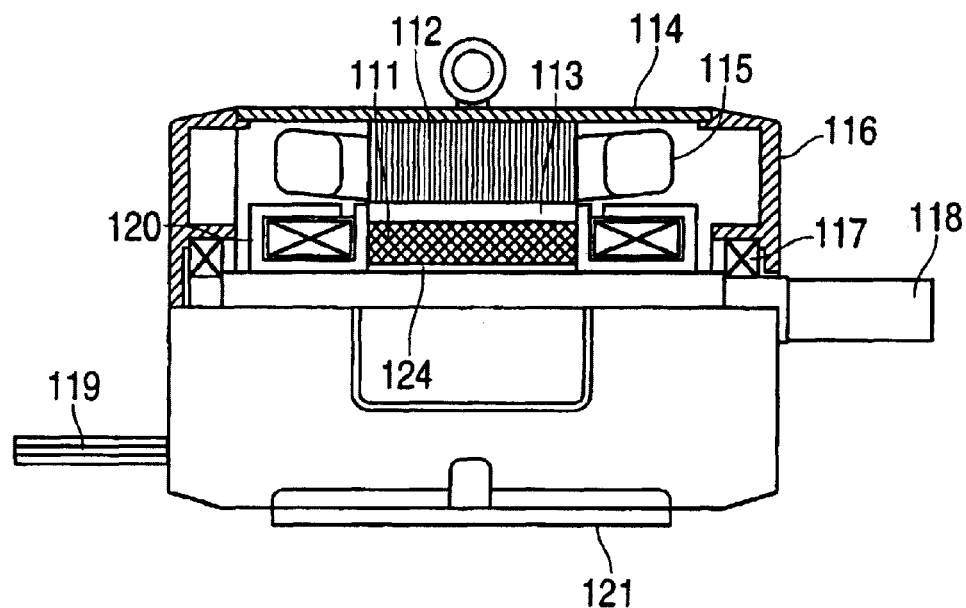
FIGS. 8A and 8B are explanatory views showing a rotor structure of a rotating machine according to the present invention (FIG. 8A) and showing a rotor structure of a rotating machine according to the prior art (FIG. 8B)
Figure 8B:
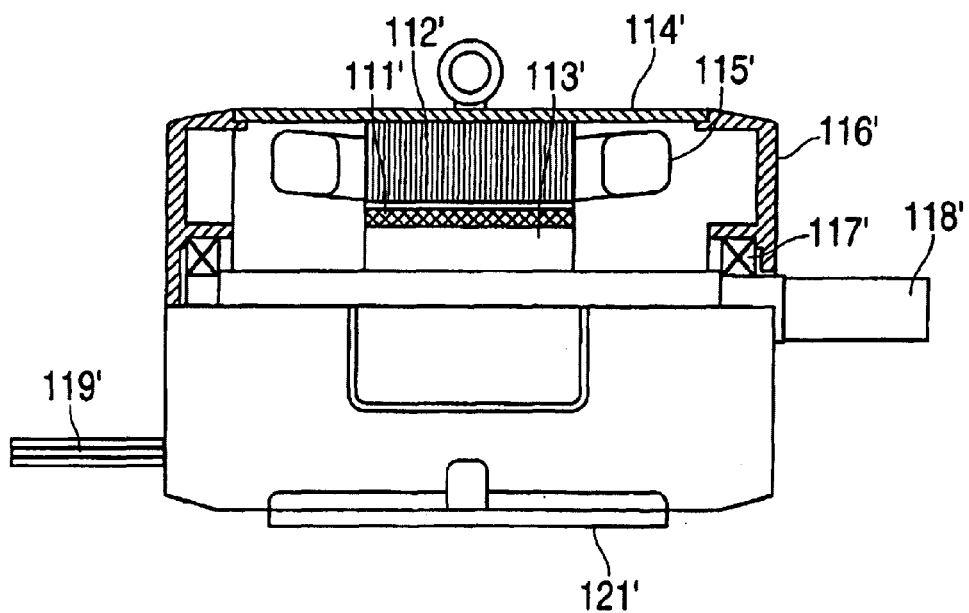

FIGS. 8A and 8B show an inner-rotor type induction motor. FIG. 8A is a cross-sectional structure showing the induction motor having a rotor 113 which is constituted by combination of a rotor 113 formed by a rotor bar 111 with an electromagnet 120, and FIG. 8B is a cross-sectional structure showing the induction motor having a conventional rotary bar rotor 113'. When the electric power is applied to coils wound around in stators 112 and 112' by cords 119 and 119', a rotation magnetic field occurs and the electromagnetic force generates between the current generated in the rotors 113 and 113', and then it works as the electric motor.

Further, a rotor 113 is driven from an outside according to the power source and to the coil 115 wound around in the stators 112 and 112', the voltage occurs in response to the rotation number and to electric power take-in cords 119 and 119' the load such as the resistance is connected and then current flows and the electric power is generated. The generation voltage of the coil is proportional to the magnetic flux density of the air gap between the stator and the rotor and also is proportional to the rotation number. According to the present invention, by the structure of the rotor 113 and by the combination of the electromagnet 120, a suitable electrical power generation system can be obtained.

Next, as to the rotor according to the present invention, hereinafter the iron core structure, the conductive plate, the rotor bar and the winding constitution etc. will be explained referring to the figures. FIGS. 9A1–9A3 and 9B1–9B3 are explanatory views showing the rotor according to the present invention; and FIG. 9A1, FIG. 9A2 and FIG. 9A3 show respectively the induction motor in which a notch portion C is provided on an outer peripheral portion and the current flowing through the rotor bar 111$a$ flows through the conductive plate 126 in which the outer periphery is cut off and the inner peripheral portion of the disc conductive plate 127' in which the electric resistance of the outer peripheral portion is increased, and then the activation and the output characteristic are improved.

With this construction, the magnetic resistance is increased by surrounding the ferro-magnetic substance arranged in both wall sides of the conductive plate 126 and a disc conductive plate 126' and the iron core 134, and in response to the height of the frequency the current is limited and then an activation characteristic and the output characteristic to the rotation number can be improved. A rotor bar 125 arranged in the iron core inner peripheral portion has the similar operation to that of the conductive plate 126 and the disc conductive plate 126', and by arranging the ferromagnetic substance 141 in the vicinity the effects can be strengthened. The width in the axial direction of the rotor iron core 124$a$ is formed larger than the axial direction width of the stator iron core 112$a$, so that the magnetic flux density can be reduced. To make the electric resistance in the rotor bar small, the electric circuit between the conductive plate 126 provided at the central portion and the disc conductive plate 126' and an end ring 123$a$ is formed short as soon as possible, and then the output improvement and the efficiency can be improved.

A reference numeral 115 indicates a stator winding, and a reference numeral 118 indicates a shaft. A reference numeral 127$a$ indicates a penetration hole which is provided on an outer peripheral portion of the conductive plate 126, and the disc conductive plate 126' and a rotor bar 111$a$ are penetrated. A reference numeral 128 indicates a penetration hole which is provided on an inner peripheral portion of the conductive plate 126 and the disc conductive plate 126' and a rotary bar 115 is penetrated. A reference numeral 129$a$ indicates a penetration hole of the shaft 118$a$.

Further, as shown in FIG. 9B1, FIG. 9B2 and FIG. 9B3, to the both sides of the rotor according to the present invention, which is constituted by a rotor bar 111$b$, an end ring 123$b$ and a rotor iron core 124$b$, an electromagnetic coil 120$b$ is arranged; using direct current for this electromagnetic coil 120$b$, a direct current magnetic field is formed, and, using the alternating current with the single phase or the multi-phase, the rotation magnetic field is formed, and the activation characteristic and the output characteristic of the rotating machine can be improved. A reference numeral 112$b$ indicates a stator iron core, a reference numeral 115$b$ indicates a rotor iron core, and a reference numeral 118$b$ indicates a shaft. A reference numeral 123$b$ indicates an end ring, a reference numeral 127$b$ indicates a penetration hole of the rotor bar, and a reference numeral 129$b$ indicates a penetration hole of the shaft 118$b$.

FIGS. 10A1–10A6 show an example for realizing the required characteristics of the rotating machine by combining the cage type rotor shown in FIG. 9B1 and the coil conductive member according to the present invention. FIG. 10A1 is similar to that of FIG. 9B1 and the explanation thereof will be omitted.

FIG. 10A2 shows a rotor in which a rotor bar 125$a$ is arranged in an inner periphery of a rotor iron core 124$c$ and in an outer peripheral portion a coil 130 is arranged. The activation characteristic and the generator characteristics are coped with the coil 130, and the coil 130 is used mainly for varying widely the characteristic of the near synchronous speed shown in a graph of FIG. 12A. A reference numeral 112$c$ indicates a stator iron core, a reference numeral 115$c$ indicates a rotor iron core, and a reference numeral 118$c$ indicates a shaft.

Figure 12A:
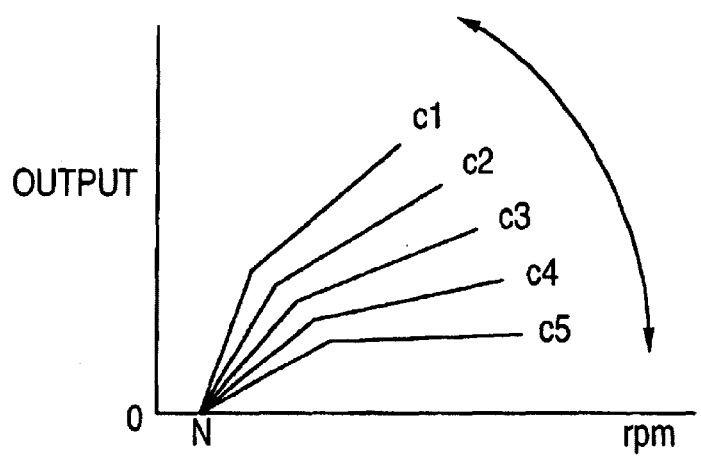
FIGS. 12A–12C are graphs showing change in characteristics of various kinds of induction generators.
Figure 12B:
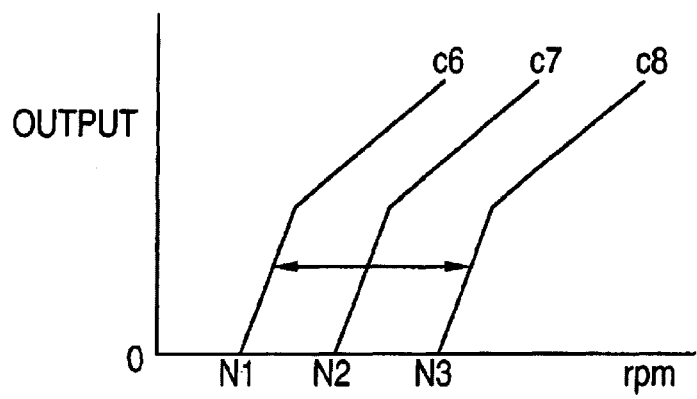
Figure 12C:
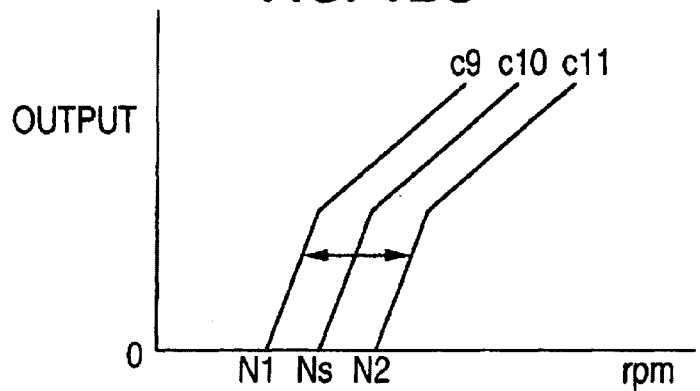

FIG. 10A3 shows a rotor in which a rotor bar 125$a$ is arranged in an inner periphery of a rotor iron core 124$c$, and at an outer peripheral portion a coil 130$a$ is arranged, and then the activation characteristic and the generator characteristic can be coped with the rotor bar 125$a$, and the coil 130$a$ varies mainly widely the characteristic in the near synchronous speed as shown in a graph of FIG. 12C. A reference numeral 112$d$ indicates a stator iron core, a reference numeral 115$d$ indicates a rotor iron core, and a reference numeral 118$d$ indicates a shaft.

FIG. 10A4 shows an example, with a similar constitution shown in FIG. 10A3, in which a thickness of the rotor iron core 124$d$ is formed thicker than a thickness of the stator iron core 112$e$. The characteristic in the near synchronous speed is varied widely with the coil 130$b$ as shown in a graph of FIG. 12C, and the hangover effect of the iron core is aimed and then the whole output characteristic and the efficiency improvement can be attained. A reference numeral 112$e$ indicates a stator iron core, a reference numeral 115$e$ indicates a stator winding, a reference numeral 118$e$ indicates a shaft and a reference numeral 125$b$ indicates a rotor bar.

FIG. 10A5 and FIG. 10A6 show examples in which rotor bars 125$c$ and 125$d$ arranged in the vicinity of the inner periphery of the rotor iron cores 124$e$ and 124$f$ and single or plural conductive plates 126$b$ and 126$c$ are put side by side. Reference numerals 112$f$ and 112$g$ indicate stator iron cores, reference numerals 115$f$ and 115$g$ indicate stator windings, reference numerals 118$f$ and 118$g$ indicate shafts, and reference numerals 130$c$ and 130$d$ indicate coils.

Further, as seen in FIG. 10A2 to FIG. 10A6, it is possible to replace the rotor bar with the coil. To the coil is applied a voltage having a phase different 90 degrees with the rotor secondary induction voltage, and the power fact of the induction generator can be varied voluntarily, and as a result in response to the load connected to the power line the power factor balance can be taken validly. Further the direct current flows to the coil and the direct current electromagnet is formed, and it can use a synchronous motor, a brushless motor, a linear motor, and a pancake type motor.

Figure 11A:
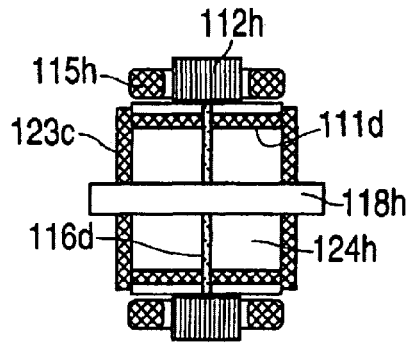
FIGS. 11A–11C are explanatory views showing a divided iron core structure for increasing centrifugal force according to the present invention.
Figure 11B:
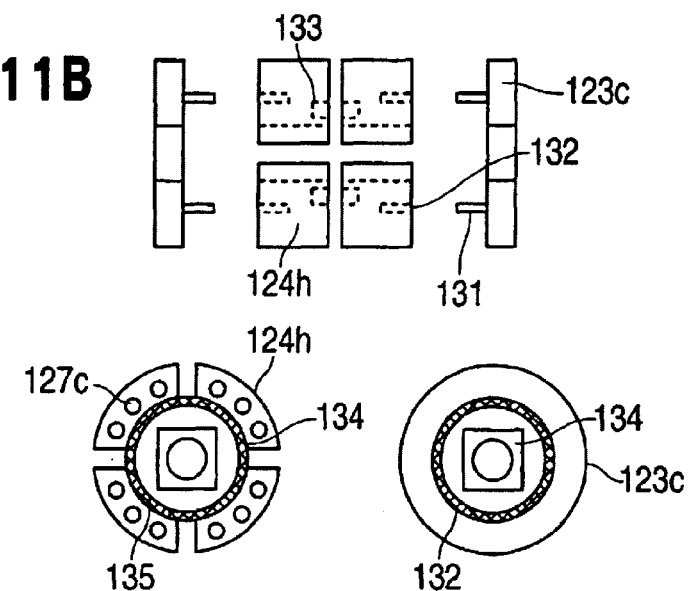
Figure 11C:
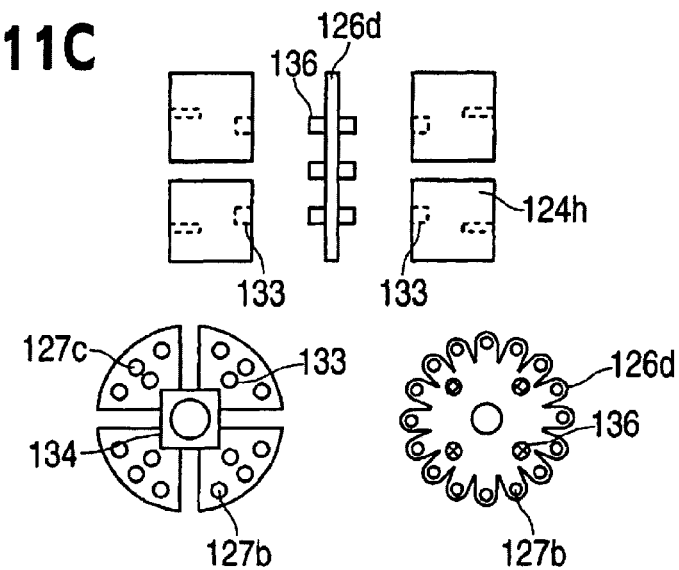

FIGS. 11A–11C are explanatory views showing an example of a rotor structure for preventing the deformation and the fly out according to the centrifugal force acted on the iron core accompanying with the rotation in a case the rotor iron core is divided to insert the magnets. FIG. 11A shows a cross-sectional view of the stator and the rotor of the rotating machine to which the present invention is applied. A reference numeral 112$h$ indicates a stator iron core, and a reference numeral 115$h$ indicates a stator winding. In the rotor, the rotor iron core 124$h$ is separated in a central portion by a conductive plate 126$d$ and a reinforcement plate, and to the both side faces of the rotor iron core 124$h$, an end ring 123$c$ is arranged and to an outer peripheral portion a rotor bar 111$d$ is arranged.

In FIG. 11B, to the end ring 123$c$ a ring shape projection 131 is provided and to the iron core 124$h$ a ring shape groove 135 which engages with the projection 131 is provided. A reference numeral 127$c$ indicates a hole which is provided on the divided iron core 124h in which the rotor bar 111d penetrates, and a reference numeral 134 indicates a spacer for supporting and fixing the divided iron core 124h. FIG. 11C shows an example in which a conductive plate 126d constituted to separate the divided iron core 124h is utilized as a reinforcement plate for preventing the deformation and the fly out by the centrifugal force. To the both faces of the conductive plate 126d the projection pins 136 are provided, to the divided iron core 124h plural holes 133 for engaging the pins 136 are provided. A reference numeral 127s is a hole in which the rotor bar 111d provided on the conductive plate 126d penetrates.

FIGS. 12A–12C are graphs showing the variation (the change) of the characteristics of the various kinds of induction generators. FIG. 12A shows the characteristic changes of the generator due to the resistance change of the conductive substance of the rotor. The resistance becomes large in proportion from $c_1$ to $c_5$. FIG. 12B is a graph showing the characteristic in which the frequency of the exciting use power source is varied, The power source frequency becomes large in proportion from $c_6$ to $c_8$.

FIG. 12C is a graph showing the change in the characteristics in which the voltage of the exciting use power source is varied and the characteristic in the near synchronous speed is varied widely. Line $c_{10}$ is one of the conditions before the characteristic change, and line $c_9$ is one in which the voltage having a reverse phase to that of the current flowing through the rotor winding is added; under the condition where the rotation number before the alteration is lowered the characteristic can be moved in parallel. Line $c_{11}$ is one in which the voltage having the same phase as that of the current for flowing the rotor winding is added; under the condition where the rotation number is raised before the alteration, the characteristic can be moved in parallel.

FIGS. 13A1, 13A2, 13B1 and 13B2 are examples in which the widths of the rotor iron cores 124i, 124j and 124m are extended beyond the axial direction widths of the stator iron cores 112i and 112j, and the hangover portion rotor bar 111e and the winding 130e can be used effectively, and then the characteristics such as the performance improvement and the efficiency improvement can be attained. Namely, the diameters of the end ring 123d and a coil end E of the rotor winding 130e are formed as small as possible, for example less than ⅓ of the outer diameter of the rotor, and they are arranged in the vicinity of the shafts 118i and 118j.

As shown in FIG. 13A2, the magnetic field formed by the current flowing through the rotor bar increases the magnetic field in the air gap portion. To ensure the magnetic field formation, the iron cores 124j, 124k and 124n formed by the sintering and laminated layer are provided. The magnetic flux formed by the current I passes through to the outside portion once and passes through the iron cores 124k and 124n and returns to the air gap from the adjacent pole iron core. Reference numerals 115i, 115j indicate stator windings, and a reference numeral 126e is a conductive plate which works the same role of the deep groove rotor bar and the end ring 123d.

FIGS. 14A1, 14A2, 14B1 and 14B2 are examples in which an axial direction length of the rotor iron cores 124o and 124r is formed longer that the length of the stator iron cores 112k and 112m and the characteristic improvement and the efficiency improvement can be obtained. FIG. 14A1 and FIG. 14A2 are examples in which the stator iron core 112k is extended to the hangover rotor bar 111f and the characteristic improvement is obtained by an additional action between the current I for flowing the hangover rotor bar 111f and the stator winding 115k. Reference numerals 124p and 124q are iron cores which are made of sintered material and have small eddy loss. A reference numeral 118k indicates a shaft, and a reference numeral 126f indicates a conductive plate.

FIGS. 15A1–15A4 show a rotary machine in which in the windings of the stator and the rotor slot-less cylindrical shape iron cores 112n and 124u are fixed to the coils 115n and 130f using an adhesive agent, etc., and then the cogging torque can be made small and the activation torque can be made small and the efficiency can be improved. To not deform or not to peel off the fixed coils 115n and 130f during the rotation time, a fastening projection 151 provided on cylindrical shape holding members 150 and 150a and the hole provided on the cylindrical iron cores 112n and 124u are utilized. To the adhesive agent 160 magnetic substance powders 160a are immersed.

FIG. 15A1 is an explanatory view showing an example in which to the stator core a slit-less iron core is applied, and FIG. 15A2 is an explanatory view showing an example in which to the rotor core a slit-less iron core is applied. A reference numeral 111g indicates a rotor bar of a cage type rotor and a reference numeral 123f indicates an end ring of the cage type rotor. Reference numerals 118n and 118o indicate shafts, and a reference numeral 112o indicate a stator iron core and a reference numeral 115o indicates a stator iron core. FIG. 15A3 is a view in which the winding is developed in a circumferential direction. FIG. 15A4 is a cross-sectional view in which FIG. 15A3 is seen from a side face, and the relationship between the cylindrical iron core 112, the coil 115 and the holding member 150 and the fastening projection 151 is shown.

Figure 16A:
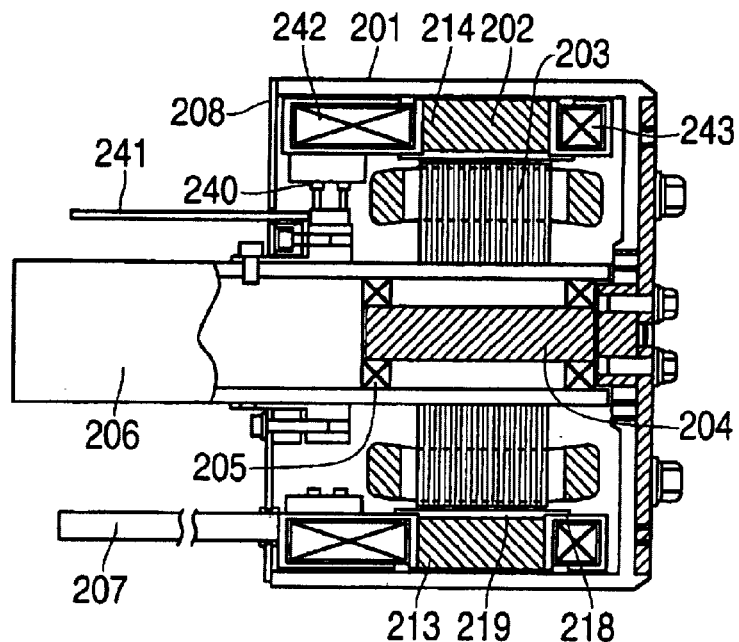
FIGS. 16A and 16B are structural views showing a generator in which a rotor is formed by extending a magnet or an electromagnet in an axial direction according to the present invention (FIG. 16A) and is a structural view showing a generator according to the prior art (FIG. 16B)
Figure 16B:
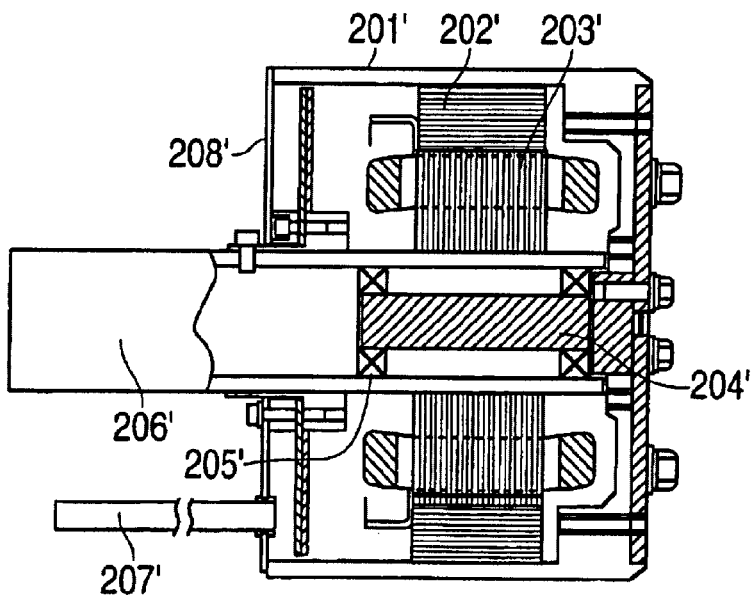

FIGS. 16A and 16B show an outer-rotor type generator. FIG. 16A is a cross-sectional view showing the generator having a rotor 202 which is constituted by magnets 214 or electromagnets 242 and 243 and a combination thereof according to the present invention, and FIG. 16B is a cross-sectional view showing a generator having a conventional cylindrical type magnet rotor 202'.

Next, the magnetic flux improvement countermeasurement in the air gap according to the magnets will be explained referring to FIGS. 17A–17F and FIGS. 18A–18F. FIGS. 17A–17F are examples showing the outer-rotor type generator and FIGS. 18A–18F are examples showing the inner-rotor type generator. In a cross-sectional figure shown in FIG. 17A, the generator is constituted by a power transmitting outer frame 210 in which a rotor material is made of a non-magnetic substance, six divided iron cores 213 and six magnets 214. In this case a space sandwiched by the stator, a portion and b portion of a side outer frame, the outer frame 210 and the iron core 213 is constituted by a non-magnetic substance. Since the twice times of the radial direction length of the magnet 214 is made larger than the circumferential direction length of one pole part of the air gap portion, the magnetic flux in the air gap portion can be made larger than the magnetic flux of the magnet 214.

Figure 17A:
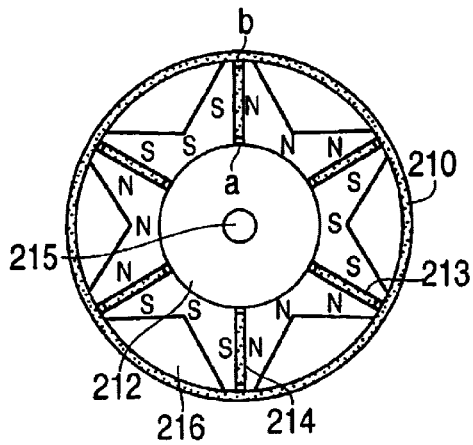
FIGS. 17A–17F are cross-sectional explanatory views showing a magnet type rotor of an outer-rotor type generator according to the present invention and six embodiments of a magnetic flux of an air gap.
Figure 17D:
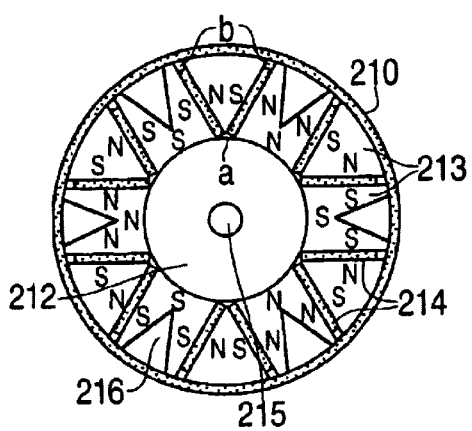
Figure 17B:
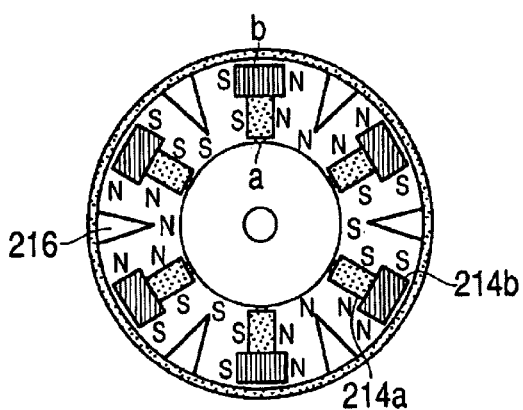
Figure 17E:
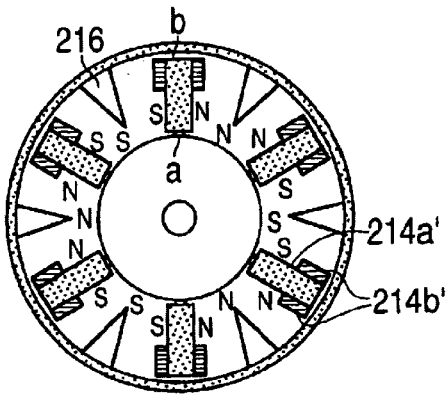
Figure 17C:
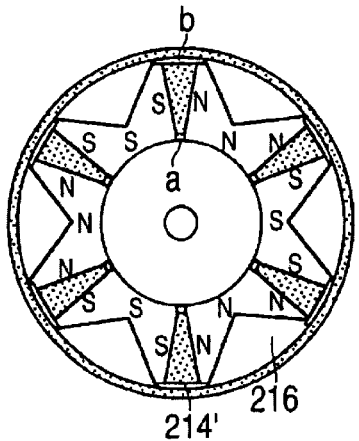
Figure 17F:
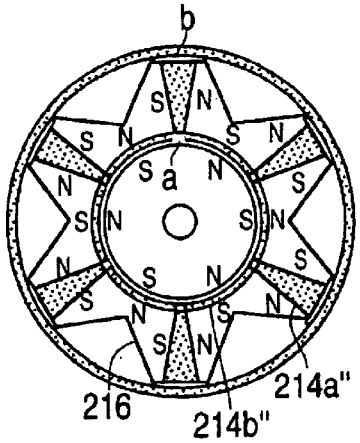
Figure 18A:
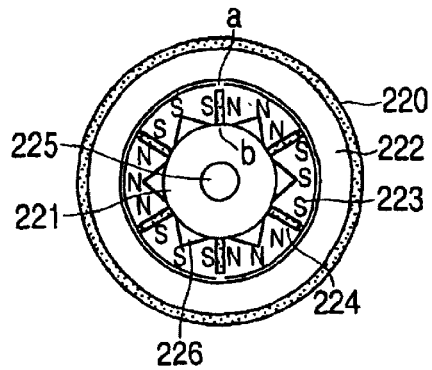
FIGS. 18A–18F are cross-sectional explanatory views showing a magnet type rotor of an inner-rotor type generator according to the present invention and six embodiments of a magnetic flux of an air gap.
Figure 18D:
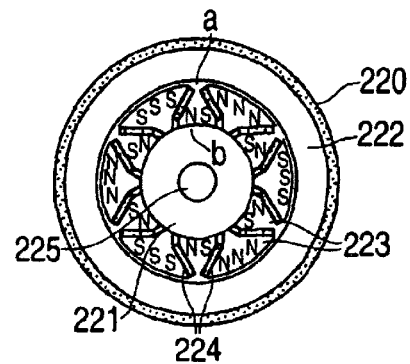
Figure 18B:
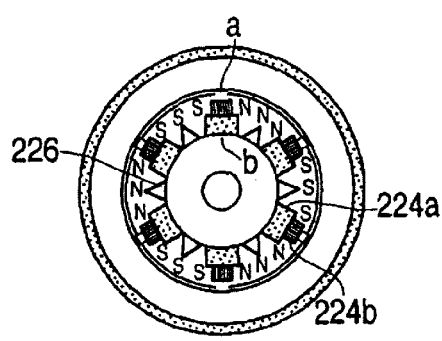
Figure 18E:
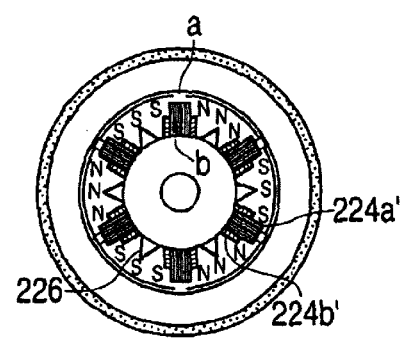
Figure 18C:
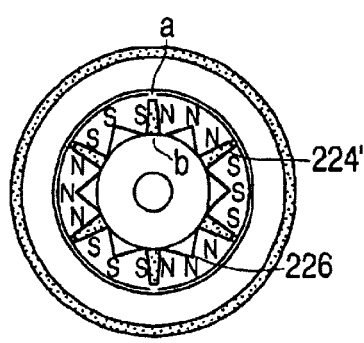
Figure 18F:
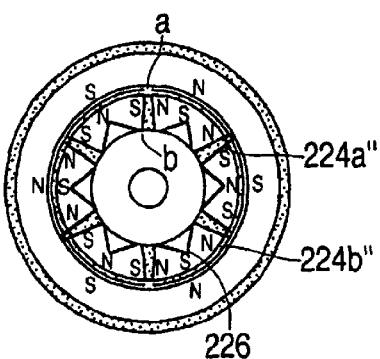

FIG. 17B is an example in which the magnets 214a and 214b having the different strength are inserted into a slit. FIG. 17C is an example in which a cross-section of the magnet is a trapezoid shape. FIG. 17D is an example in which two magnets having the same strength are increased per one pole. FIG. 17E is an example in which two kinds of magnets are used, and a main magnet 214 determines the magnetic field in the air gap and a magnet 214' adjusts minutely the magnetic field. FIG. 17F is an example in which to the conventional cylindrical magnet the magnet according to the present invention is combined.

FIG. 18A–FIG. 18F show the inner-rotor type generator and have a reversal structure of the outer-rotor type generator shown in FIGS. 17A–17F, and since the structure thereof is basically the same explanation thereof will be omitted.

Figure 19:
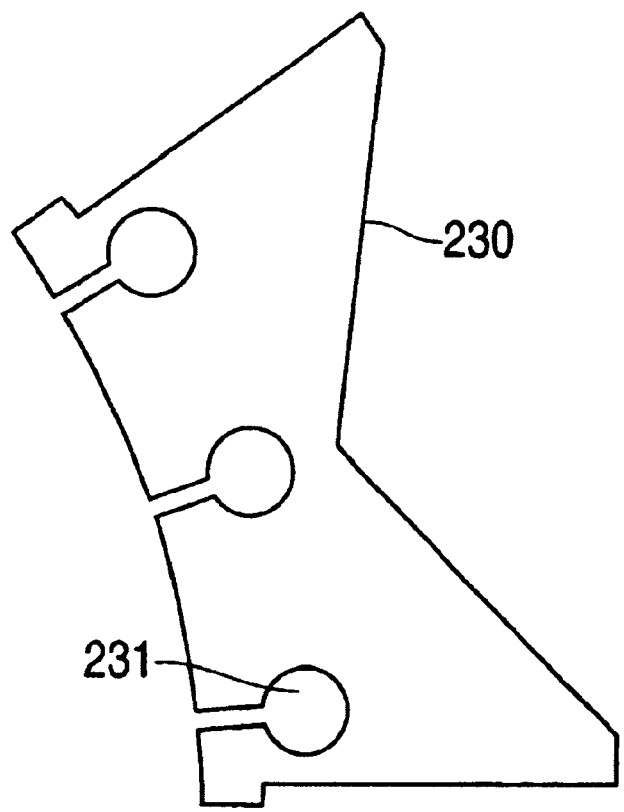
FIG. 19 is a view showing a divided iron core structure of a magnet type rotor of an outer-rotor generator according to the present invention.

FIG. 19 is a plan view showing an example of the divided iron core part of the rotor of the above stated outer-rotor type generator and facing to the air gap between the stator three slots 231 are provided.

Figure 20A:
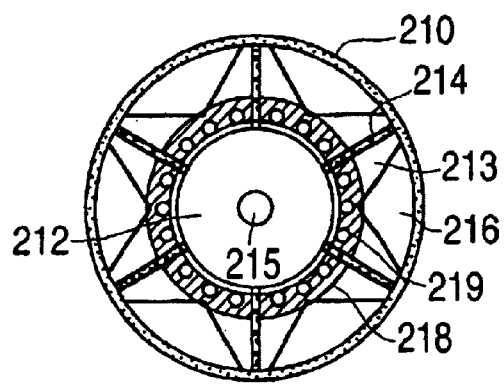
FIGS. 20A–20E are views showing a divided iron core structure of a cage type rotor of an outer-rotor generator according to the present invention.
Figure 20B:
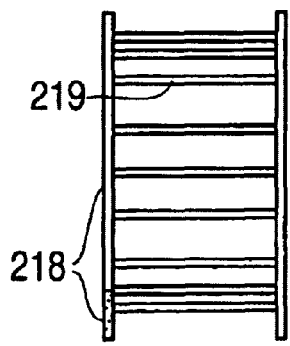
Figure 20C:
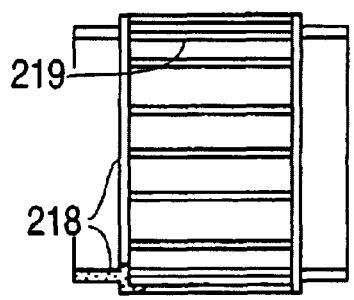

FIGS. 20A–20E are examples in which using the structure shown in FIG. 19 to the rotor of the outer-rotor type generator the cage type rotor is formed. The structure of a cage type rotor part is shown in FIG. 20B and FIG. 20C and is made of the conductive member such as aluminum and brass, and by two side sheets 218 and plural bars 219 the rotor is formed integrally using the caulking and die casting. When the magnet according to the present invention is extended to the axial direction, in a case shown in FIG. 20B, the iron core is separated by the side plate 218.

In FIG. 20C, the radial direction length of the side plate 218 is formed as small as possible, and the cross-section thereof is formed the same and is extended in the axial direction. The side plate is arranged in the inner peripheral face of the magnet iron core (in the case of the inner-rotor type generator, to the outer peripheral face thereof), to concentrate the magnetic flux from the magnet which is extended to the both sides and the electromagnet to the stator air gap; and further the side plate is arranged with a stepwise part 232, which is provided to prevent the leakage from the side face of the stator, of the rotor iron core, and thereby the effect on the magnetic path can be lessened.

Figure 20D:
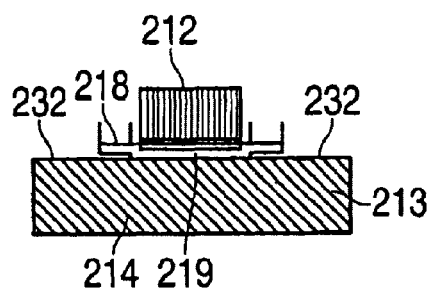
Figure 20E:
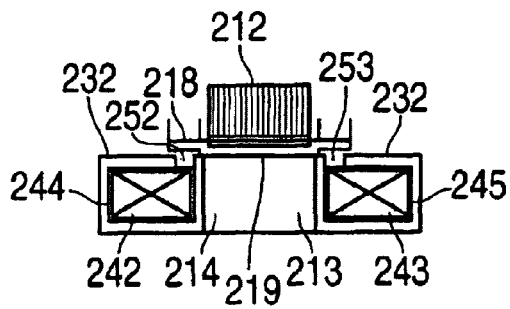

FIG. 20D is an example in which only the magnet 214 is extended in the axial direction of the rotor, and FIG. 20E is an example in which electromagnets 242 and 243 are added to the both sides of the rotor magnet 214 faced with the stator 212. In this case, a magnetic flux leakage gap 252 of the electromagnet 242 and a magnetic flux leakage gap 253 of the electromagnet 243 are provided to work validly to the prevention of a short-circuit of the magnetic flux to the stator.

Figure 21A:
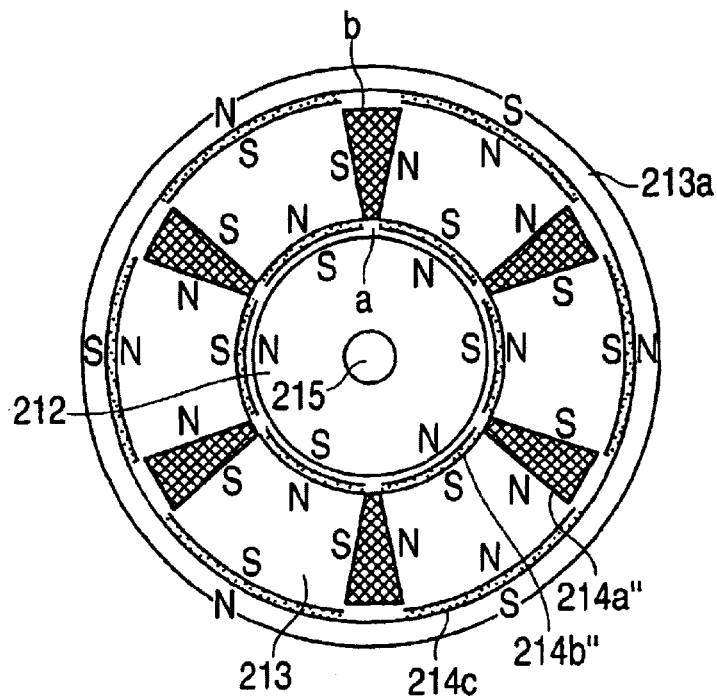
FIGS. 21A and 21B are views showing a divided iron core structure of a magnet type rotor of an outer-rotor generator according to the present invention, and the magnet is arranged on a solid face of the divided iron core.
Figure 21B:
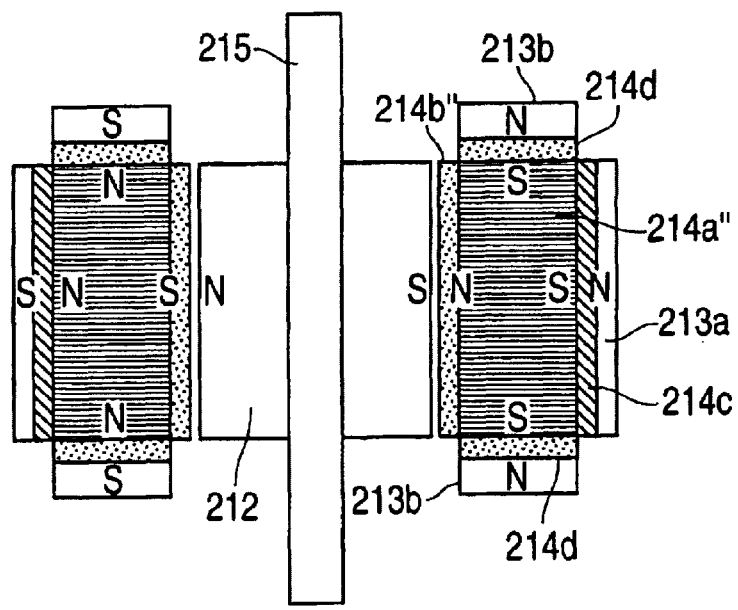

FIGS. 21A and 21B are an example of a case where there is a limitation of the space of the magnetic pole arrangement of the electric motor and the generator as shown in FIG. 17F; utilizing validly the limited magnetic pole space, a whole face or a part of the solid face of the magnets are arranged and to the air gap portion the magnetic flux can be concentrated at the maximum. For example, a magnet 214a" and a magnet 214d arranged to the axial direction magnetic pole face can be formed in a ring shape and can be formed as an integral structure. Further, by combining a magnet 214c or a magnet 214b", a cap shape can be formed.

The magnet 214c is a cylindrical shaped magnet which is arranged in the outer peripheral portion of the magnetic pole, and on the periphery thereof an iron core 213a for forming the magnetic path of the magnetic flux is arranged. To an outer side of the magnet 214d an iron core 213b is arranged, and the magnet 214d is worked validly. All magnets are settled and arranged to concentrate the magnetic flux to the air gap portion and have the polarity of the respective magnet of N and S shown in the figures.

Figure 22A:
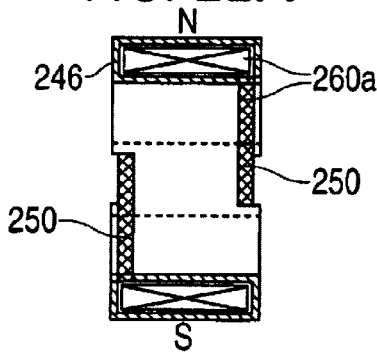
FIGS. 22A–22H are explanatory views showing a two-pole magnetic pole electromagnet having a donut structure, able to combine with another magnet according to the present invention.
Figure 22B:
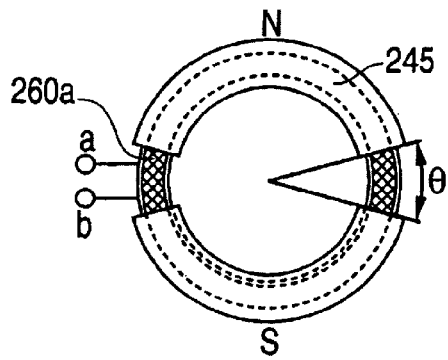

FIGS. 22A–22H and FIGS. 23A–23H are explanatory views showing donut shape electromagnet structures which are able to be combined with another magnet and electromagnet. FIGS. 22A–22H show examples in which the magnet poles are two poles and FIGS. 23A–23H show examples in which the magnet poles are six poles. Next, the detailed explanation of the electromagnets will be explained referring to FIGS. 22A–22H. In FIG. 22A and FIG. 22B, to an outer periphery two magnetic poles of N and S are formed, and when they are used as the rotor it can apply to the inner-rotor type generator.

Further, in the case of the combination with other magnets and electromagnets, by adjusting the other part magnetic poles, they are carried out on the outer peripheral face. The adjustment of the magnetic pole is carried out by varying the magnetic polarity of the direct current power source from terminals of a and b of a coil 260a. A reference numeral 250 indicates a gap for preventing the short-circuit of the magnetic fluxes of N pole and S pole. An electric angle of a cut portion shown in FIG. 22B is requested by a following formula:

cut portion electric angle=180 degrees−{2π×phase number to be excited/rotor pole number×electric motor phase number} degrees This devotes the improvement of the output efficiency of the electric machine by making the minimum the conversion loss accompanied with the electric pole conversion generated in the coil.

Figure 22C:
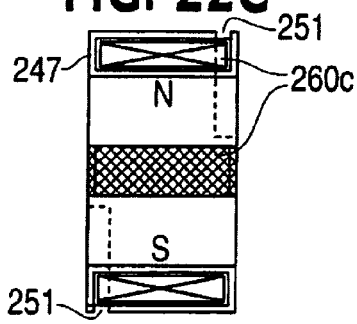
Figure 22D:
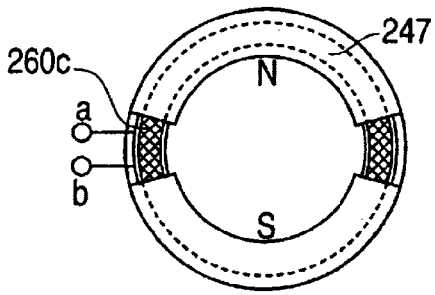
Figure 22E:
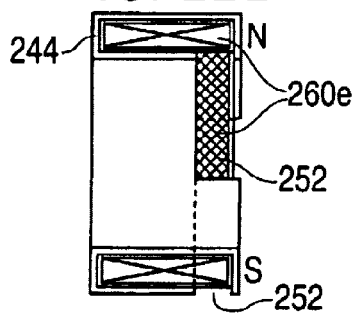
Figure 22F:
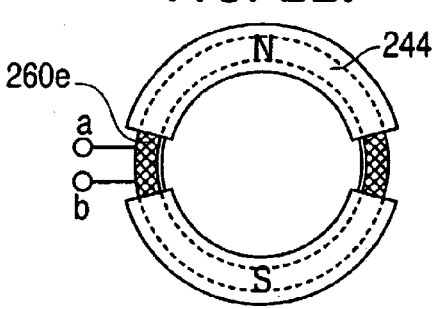
Figure 22G:
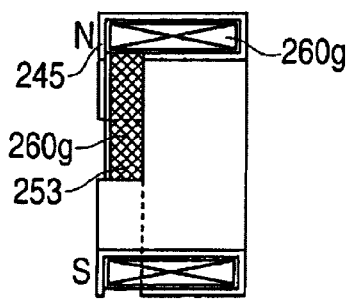
Figure 22H:
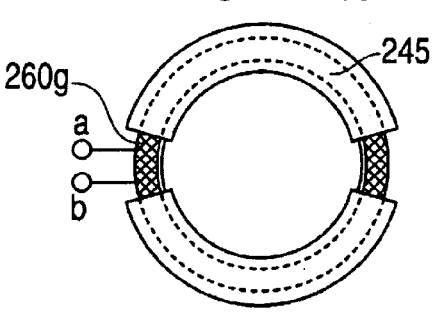
Figure 23A:
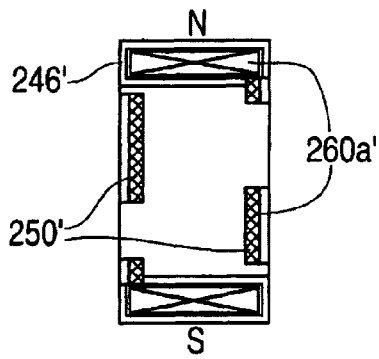
FIGS. 23A–23H are explanatory views showing a six-pole magnetic pole electromagnet having a donut structure, able to combine with another magnet according to the present invention.
Figure 23B:
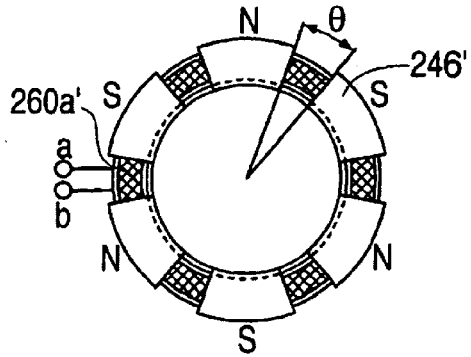
Figure 23C:
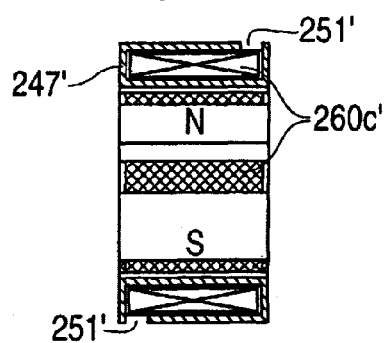
Figure 23D:
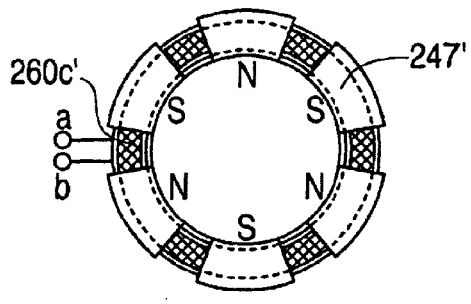
Figure 23E:
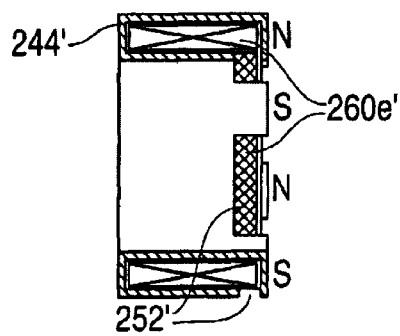
Figure 23F:
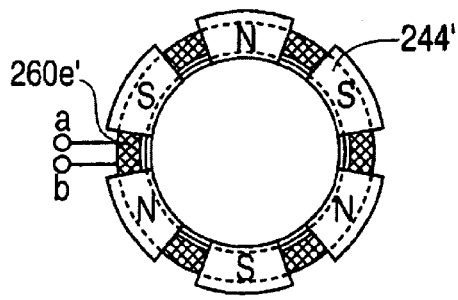
Figure 23G:
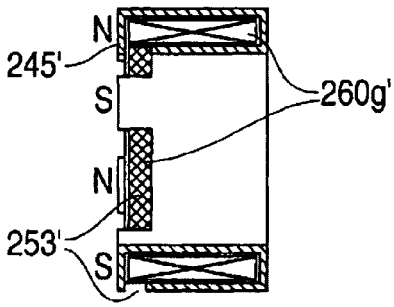
Figure 23H:
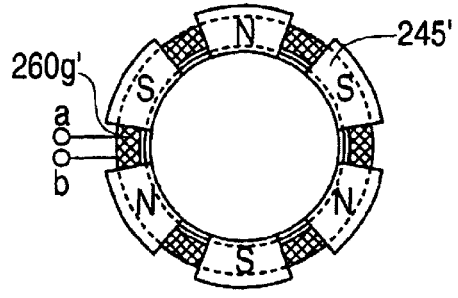
Figure 25A:
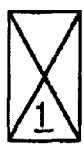
FIGS. 25A–25J are explanatory views showing a combination example of a magnet and an electromagnet in an inner-rotor type according to the present invention.
Figure 25B:
Figure 25C:
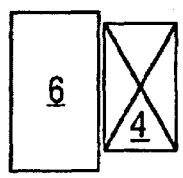
Figure 25D:
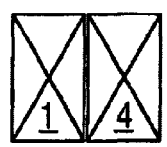
Figure 25E:
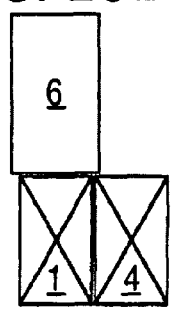
Figure 25F:
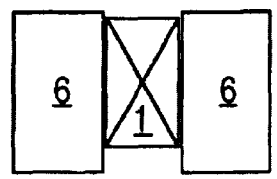
Figure 25G:
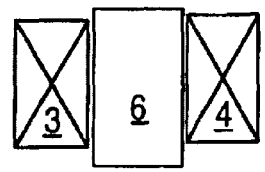
Figure 25H:
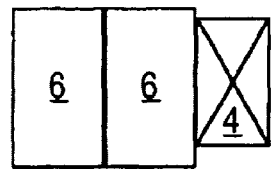
Figure 25I:
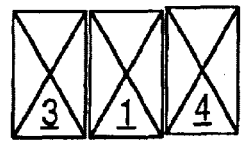
Figure 25J:
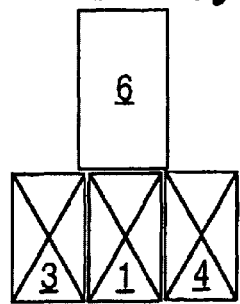

FIG. 22C and FIG. 22D show the structures having the magnetic pole on the inner peripheral face and have the reversal structures shown in FIG. 22A and FIG. 22B. In FIG. 22E and FIG. 22F the magnetic poles are the right face and in FIG. 22G and FIG. 22H the magnetic poles are the left face. FIGS. 24A and 24B are schematic views showing four kinds of electromagnets of the six pole electric machine and the magnets of the inner and outer rotor. FIG. 24A includes FIGS. 24A1–24A4, and FIG. 24B includes FIGS. 24B5 and 24B6. FIG. 24A1 shows an outer periphery magnetic pole type electromagnet, FIG. 24A2 shows an outer periphery magnetic pole type electromagnet, FIG. 24A3 shows a right face magnetic pole type electromagnet and FIG. 24A4 shows a left face magnetic pole type electromagnet. Further, FIG. 24B5 shows an outer-rotor use magnet and FIG. 24B6 shows an inner-rotor use magnet.

Figure 26A:
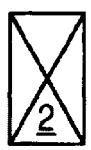
FIGS. 26A–26J are explanatory views showing a combination example of a magnet and an electromagnet in an outer-rotor type according to the present invention.
Figure 26B:
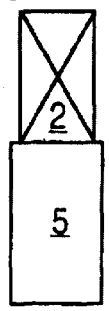
Figure 26C:
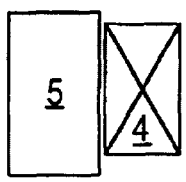
Figure 26D:
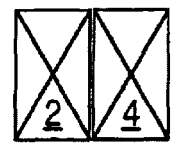
Figure 26E:
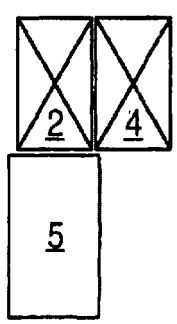
Figure 26F:
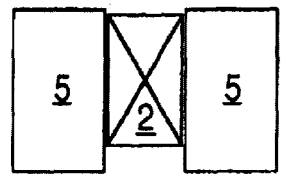
Figure 26G:
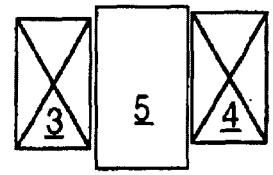
Figure 26H:
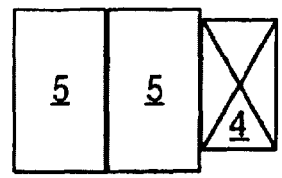
Figure 26I:
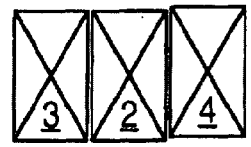
Figure 26J:
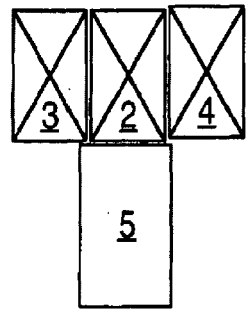

FIGS. 25A–25J are examples showing a combination of the inner-rotor use magnets and electromagnets, and FIGS. 26A–26J are examples showing a combination of the outer-rotor use magnets and electromagnets. Herein, the examples shown in FIGS. 26A–26J will be explained. FIG. 26A is an example in which the magnetic pole is formed with only one outer periphery magnetic pole type electromagnet. FIG. 26B is an example in which one electromagnet is arranged in an interior portion and one magnet is arranged in an outer side. FIG. 26C is an example having the magnet and the left face magnetic pole type electromagnet. FIG. 26D is an example in which two electromagnets are arranged, and FIG. 26I is an example in which three electromagnets are arranged. FIG. 26E and FIG. 26F are examples in which the magnet is combined to the outer face of the electromagnet shown in FIG. 26D and FIG. 26I. FIG. 26F, FIG. 26G and FIG. 26H are examples in which to one magnet or electromagnet two other magnets or electromagnets are combined.

Figure 27A:
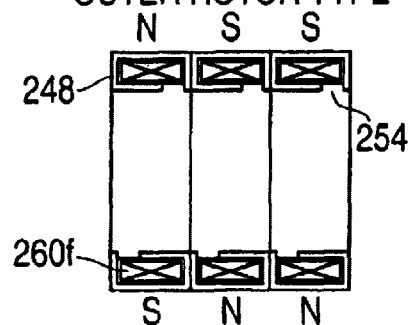
FIGS. 27A–27D are views showing a stator of a three-phase two-pole motor using three inner-outer periphery magnetic pole type electromagnets according to the present invention.
Figure 27B:
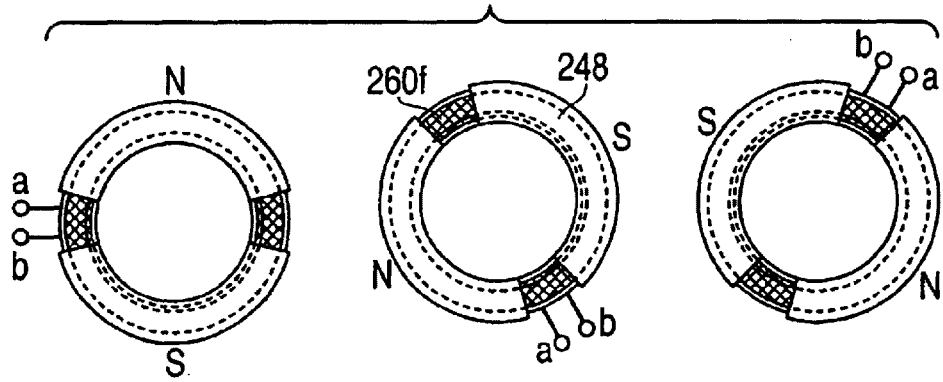
Figure 27C:
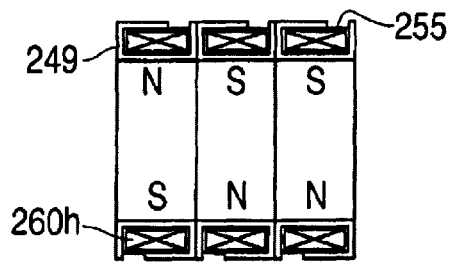
Figure 27D:
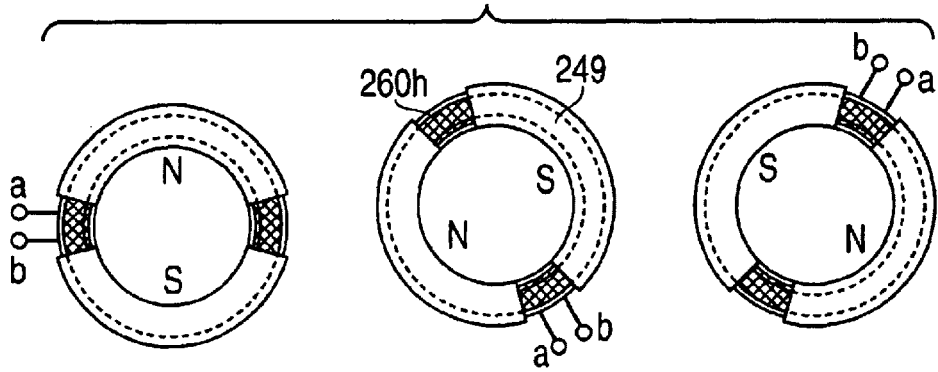
Figure 28A:
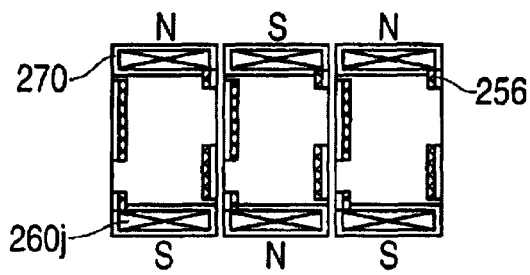
FIGS. 28A–28B are views showing a stator of a three-phase six-pole motor using three inner-outer periphery magnetic pole type electromagnets according to the present invention.
Figure 28B:
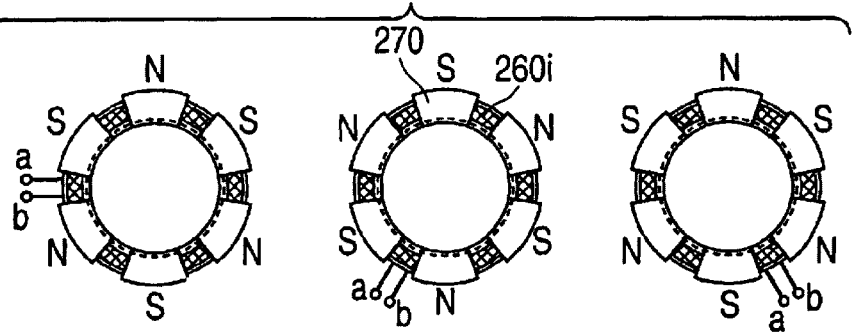
Figure 28C:
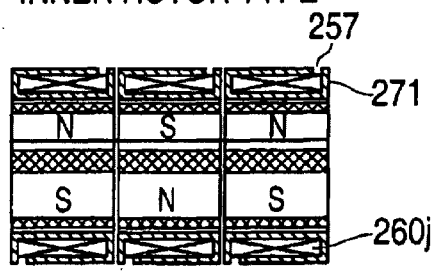
Figure 28D:
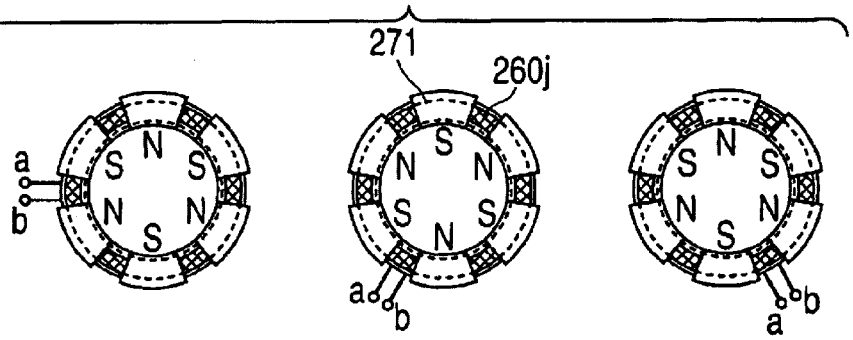

FIGS. 27A–27D and FIGS. 28A–28D are examples in which the stator of the three phase electric machine uses three pieces of the two pole or the six pole inner and outer magnetic pole electromagnets. FIG. 27A and FIG. 27B show examples in which the electromagnets are applied to the stator of the alternating current two poles of the outer-rotor type rotor. FIG. 27A shows the stator and FIG. 27B shows a positional relationship of the electromagnets during a combination of the respective phase in which it shifts with electric angle of 120 degrees. FIG. 27C and FIG. 27D show examples in which the electromagnets are applied to the stator of the inner-rotor type rotor. FIG. 28 is an example in which the electromagnets are applied to the stator of the three phase six pole electric machine. FIG. 28A shows the stator and FIG. 28B shows a positional relationship of the electromagnets during a combination of the respective phase in which it shifts with electric angle of 120 degrees. FIG. 28C and FIG. 28D show examples in which the electromagnets are applied to the stator of the inner-rotor type rotor.

Figure 29A:
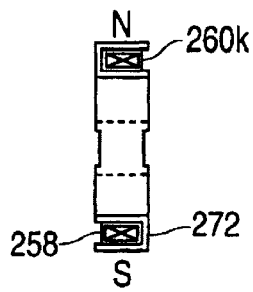
FIGS. 29A–29J are explanatory views showing a structure of a two-pole electromagnet iron core according to the present invention.
Figure 29B:
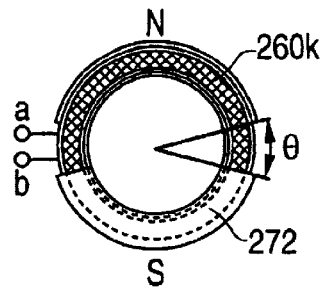
Figure 29C:
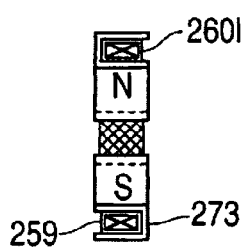
Figure 29D:
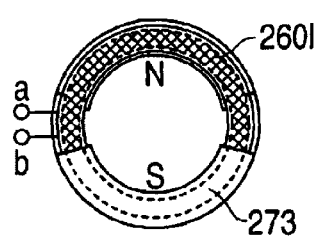
Figure 29E:
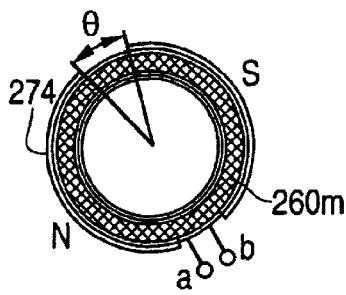
Figure 29F:
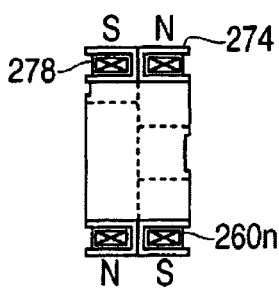
Figure 29G:
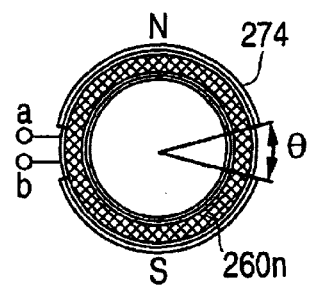
Figure 29H:
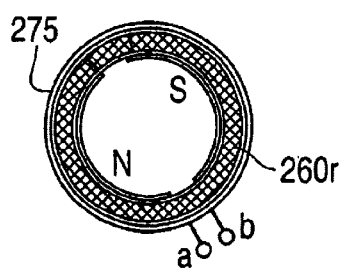
Figure 29I:
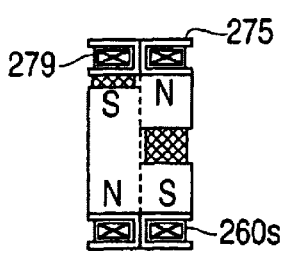
Figure 29J:
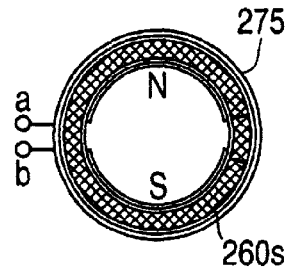

FIGS. 29A–29J are explanatory views showing a structure of two pole electromagnet iron core and shows the structure in which it is possible to manufacture the iron core using only one manufacturing tool. FIG. 29A shows one winding use outer periphery magnetic pole of the iron core and FIG. 29B shows one winding use inner periphery magnetic pole of the iron core. An iron core 272 forms the outer periphery magnetic pole type and an iron core 273 forms the inner periphery magnetic pole type. FIG. 29E, FIG. 29F, and FIG. 29G show examples of two winding use outer periphery magnetic poles of the iron core, and FIG. 29H, FIG. 29I, and FIG. 29J show examples of two winding use inner periphery magnetic poles of the iron core. The structures shown in FIG. 29E, FIG. 29F, FIG. 29G, FIG. 29H, FIG. 29I, and FIG. 29J can be utilized as the three-phase electric machine.

Figure 30A:
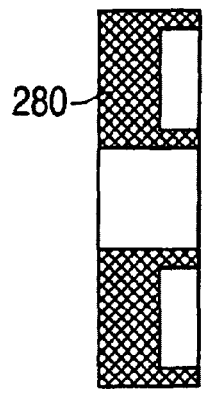
FIGS. 30A–30F are explanatory views showing an iron core structure for lessening an eddy current loss of an alternating current electromagnet according to the present invention.
Figure 30B:
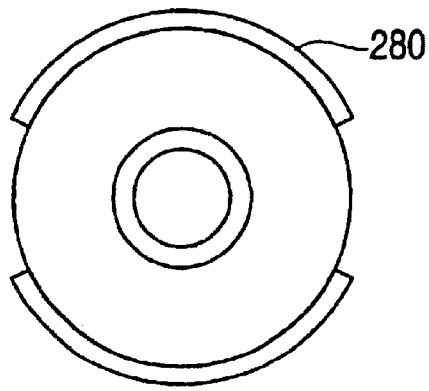
Figure 30C:
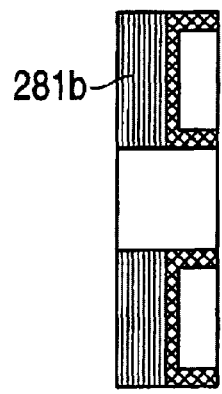
Figure 30D:
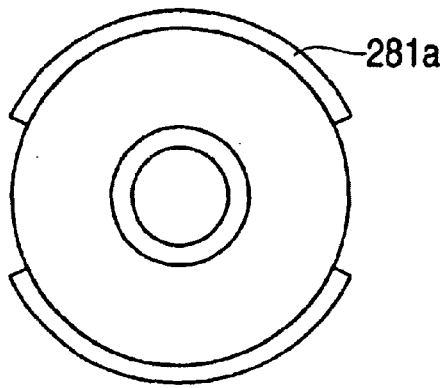
Figure 30E:
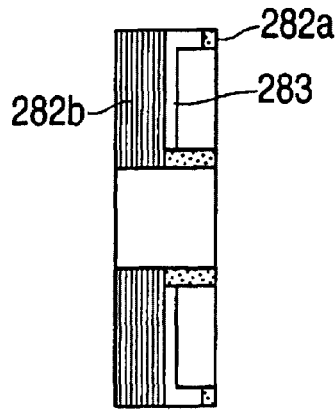
Figure 30F:
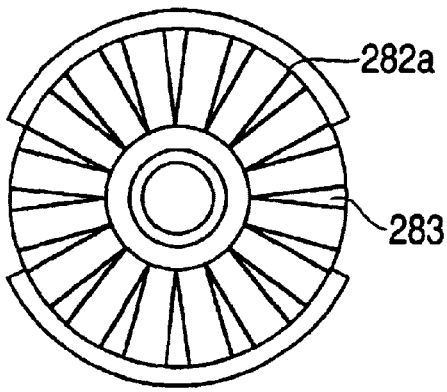

FIGS. 30A–30F are explanatory views showing an iron core structure to lessen the eddy current loss of the alternating current electromagnet. FIG. 30A and FIG. 30B show the iron core structures in which the sintering member and the iron powder are solidified by the bonding material. FIG. 30C and FIG. 30D show examples of a combination of an electromagnetic steel plate 281b with an is iron core 281a in which the sintering material and the iron powder are bonded by the bonding material. FIG. 30E and FIG. 30F show examples of a combination of an electromagnetic steel plate 282b with an iron core 282a which constitutes a squeezing structure of a thick iron plate having slits 283.

What is claimed is:

1. A system comprising:
   at least two electrical devices, wherein each electric device includes:
   an induction motor and is selectable in real-time to operate as either an electric motor for driving a load and as a generator to generate electrical power;
   a mechanical power source selectably connectable to the induction motor, wherein selectable connection is to mechanically drive the induction motor to operate the same as a generator; and
   an electrical power source selectably connectable to the induction motor, wherein selectable connection to operate the induction motor as a motor to drive the load.

2. The system according to claim 1, comprising the load, adapted to be driven by the induction motor when the induction motor functions as the motor.

3. The system according to claim 2, wherein the induction motor, when functioning as the motor, is an alternating current electric motor, and the load is selected from the group consisting of machine tools and compressors; and wherein the mechanical power source being at least one selected from the group consisting of a direct current electric motor, an internal combustion engine, a source of wind power, a source of hydraulic power and a source of manually-generated power.

4. The system according to claim 1, wherein the induction generator, functioning as the generator, is electrically connected to an electric power line.

5. The system according to claim 1, wherein when the induction motor is functioning as a generator, and generates electrical power, the induction motor is in a non-load condition and has a speed near a synchronous speed.

6. The system according to claim 1, comprising sensors for detecting conditions of the system, thereby obtaining detected data; and when the electric device changes from a stopped status or a status of driving the load to a status of generating electrical power, the stopped status or status of driving the load is changed over to electrical power generation based upon the detected data, whereby the system is operation-controlled.

7. The system according to claim 6, wherein said sensors detect a load condition and electrical power supplied by said electrical power source.

8. A system comprising:
   at least two electrical devices, wherein each electric device includes:
   an induction motor and is selectable in real-time to operate as either an electric motor for driving a load and as a generator to generate electrical power;
   a first mechanical power source selectably connectable to the induction motor, wherein selectable connection is to mechanically drive the induction motor to operate the same as a generator;
   a second mechanical power source selectably connectable to the induction motor, wherein selectable connection is to mechanically drive the induction motor to operate the same as a generator;
   an first electrical power source selectably connectable to the induction motor, wherein selectable connection is to operate the induction motor as a motor to drive the load; and
   a second electrical power source selectably connectable to the induction motor, wherein selectable connection is to operate the induction motor as a motor to drive the load.

9. The system according to claim 8, wherein said induction motor, when functioning as an electric motor, is an alternating current electric motor, and the load is selected from the group consisting of machine tools and compressors, and wherein the first mechanical power source and the second mechanical power source are each being at least one selected from the group consisting of a direct current electric motor, an internal combustion engine, a source of wind power, a source of hydraulic power and a source of manually-generated power.

10. The system according to claim 1, wherein ones of the induction motor are each selectable as either the electric motor or the generator, independently of other induction motors.

11. The system according to claim 1, wherein the load and the mechanical power source are different from one another.

12. The system according to claim 1, wherein the electrical power source includes connection to alternating current electrical wiring, and the mechanical power source includes connection to the alternating current electrical wiring.

13. The system according to claim 1, comprising an electrical network including at least one of sensor and control, for changing an operational status of the induction motor from the motor to the generator or vice-versa based upon at least one predetermined condition.

14. The system according to claim 13, wherein the induction motor is operated as the motor upon a predetermined condition of mechanical power of the mechanical power source being disconnected from the induction motor.

15. The system according to claim 13, wherein the induction motor is operated as the generator upon a predetermined condition of a rotational speed of the induction motor becoming greater than a synchronous speed of the induction motor.

16. The system according to claim 13, wherein the induction motor is operated as the generator upon a predetermined condition of the induction motor being disconnected into a free state from the load.

17. The system according to claim 13:
wherein the induction motor is operated as the motor upon a predetermined condition of mechanical power of the mechanical power source being disconnected from the induction motor;
wherein the induction motor is operated as the generator upon a predetermined condition of a rotational speed of the induction motor becoming greater than a synchronous speed of the induction motor; and
wherein the induction motor is operated as the generator upon a predetermined condition of the induction motor being disconnected into a free state from the load.

18. The system according to claim 8, wherein ones of the induction motor are each selectable as either the electric motor or the generator, independently of other induction motors.

19. The system according to claim 8, wherein the load is different from each of the first mechanical power source and the second mechanical power source.

20. The system according to claim 8, wherein the electrical power source includes connection to alternating current electrical wiring, and at least one of the first mechanical power source and the second mechanical power source includes connection to the alternating current electrical wiring.

21. The system according to claim 8, comprising an electrical network including at least one of sensor and control, for changing an operational status of the induction motor from the motor to the generator or vice-versa based upon at least one predetermined condition.

22. The system according to claim 21, wherein the induction motor is operated as the motor upon a predetermined condition of mechanical power of the first mechanical power source and the second mechanical power source being disconnected from the induction motor.

23. The system according to claim 21, wherein the induction motor is operated as the generator upon a predetermined condition of a rotational speed of the induction motor becoming greater than a synchronous speed of the induction motor.

24. The system according to claim 21, wherein the induction motor is operated as the generator upon a predetermined condition of the induction motor being disconnected into a free state from the load.

25. The system according to claim 21:
wherein the induction motor is operated as the motor upon a predetermined condition of mechanical power of the first mechanical power source and the second mechanical power source being disconnected from the induction motor;
wherein the induction motor is operated as the generator upon a predetermined condition of a rotational speed of the induction motor becoming greater than a synchronous speed of the induction motor; and
wherein the induction motor is operated as the generator upon a predetermined condition of the induction motor being disconnected into a free state from the load.

* * * * *